(12) United States Patent
Chastain et al.

(10) Patent No.: US 10,764,242 B2
(45) Date of Patent: Sep. 1, 2020

(54) PROVIDING NETWORK ADDRESS TRANSLATION IN A SOFTWARE DEFINED NETWORKING ENVIRONMENT

(71) Applicant: AT&T Intellectual Property I, L.P., Atlanta, GA (US)

(72) Inventors: Walter Cooper Chastain, Atlanta, GA (US); Larry B. Pearson, San Antonio, TX (US); Cameron Scott Blandford, Yorktown, VA (US); Cheng Liu, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 180 days.

(21) Appl. No.: 14/950,273

(22) Filed: Nov. 24, 2015

(65) Prior Publication Data
US 2017/0149733 A1 May 25, 2017

(51) Int. Cl.
*H04L 29/12* (2006.01)
(52) U.S. Cl.
CPC ...... *H04L 61/2521* (2013.01); *H04L 61/2507* (2013.01)
(58) Field of Classification Search
None
See application file for complete search history.

(56) References Cited

U.S. PATENT DOCUMENTS

| 8,528,070 | B2 | 9/2013 | Stiekes et al. | |
| 2014/0033218 | A1* | 1/2014 | McGeer | G06F 9/5066 718/104 |
| 2014/0189074 | A1* | 7/2014 | Parker | H04L 63/20 709/220 |

(Continued)

FOREIGN PATENT DOCUMENTS

| WO | WO 2014166551 | 10/2014 |
| WO | WO 2015009939 | 1/2015 |
| WO | WO 2015106389 | 7/2015 |

OTHER PUBLICATIONS

Patel et al., "Ananta: Cloud Scale Load Balancing," ACM SIGCOMM Computer Communication Review, 2013, pp. 207-218, vol. 43, No. 4, ACM.

(Continued)

*Primary Examiner* — Christopher T Wyllie
(74) *Attorney, Agent, or Firm* — Hartman & Citrin LLC

(57) ABSTRACT

Concepts and technologies are disclosed herein for providing network address translation in a software defined networking environment. A control system can detect a request to create a network address translation function. The control system can analyze a recipe to identify a network address translation switch and a network address translation virtual function that are to provide functionality of the network address translation function, trigger instantiation of the network address translation switch via a network control function, and trigger instantiation of the network address translation virtual function via a service control function. The control system can validate the network address translation function and chain the network address translation function to a host. The network address translation function can provide address translation for the host using the network address translation switch.

18 Claims, 11 Drawing Sheets

(56) References Cited

U.S. PATENT DOCUMENTS

| | | | |
|---|---|---|---|
| 2015/0215219 A1 | 7/2015 | Mattsson et al. | |
| 2015/0256509 A1 | 9/2015 | Krishnan et al. | |
| 2015/0324215 A1* | 11/2015 | Borthakur | G06F 9/45558 718/1 |
| 2016/0036730 A1* | 2/2016 | Kutscher | H04L 45/38 370/401 |
| 2016/0080415 A1* | 3/2016 | Wu | H04L 63/1491 726/23 |
| 2016/0127181 A1* | 5/2016 | Li | H04L 41/0806 370/254 |
| 2016/0150448 A1* | 5/2016 | Perras | H04W 36/12 455/450 |
| 2016/0205048 A1* | 7/2016 | Zhu | H04L 49/70 370/409 |
| 2016/0301779 A1* | 10/2016 | Cui | H04L 63/20 |
| 2017/0026387 A1* | 1/2017 | Vissamsetty | H04L 63/1408 |
| 2017/0078176 A1* | 3/2017 | Lakshmikantha | H04L 43/0852 |
| 2017/0149733 A1* | 5/2017 | Chastain | H04L 61/2507 |

OTHER PUBLICATIONS

Dixon et al., "Software defined networking to support the software defined environment," IBM Journal of Research and Development, Mar./May 2014, vol. 58, No. 2/3.

Sethi et al., "Abstractions for Model Checking SDN Controllers," Formal Methods in Computer-Aided Design (FMCAD), 2013, IEEE.

* cited by examiner

PROVIDING NETWORK ADDRESS TRANSLATION IN A SOFTWARE DEFINED NETWORKING ENVIRONMENT

BACKGROUND

Service creation, maintenance, and delivery have evolved over the past several years. One area that has changed services is the advent of virtualization. For example, the European Telecommunications Standards Institute ("ETSI") network functions virtualization ("NFV"), software defined networking ("SDN"), and other "cloud" computing architectures and technologies have resulted in a change to the traditional hardware-software model or paradigm. For example, services can be created and deployed on commercial-off-the-shelf ("COTS") hardware, which can allow flexibility in terms of scaling, locating, and/or using the services. Building services that were designed for deployment on dedicated infrastructure and instead deploying these same services in a virtualized infrastructure may not provide the benefits of using a virtualized network. Similarly, accommodating message routing between service components used to provide a virtualized service may require increased complexity of the virtualized service relative to services built on a dedicated infrastructure. Thus, while virtualization may provide flexibility to network operators and other entities, several challenges pose difficulties in migrating services to virtualized networks.

SUMMARY

The present disclosure is directed to providing network address translation in a software defined networking environment. A computing device can host a control system, which can include multiple modules or applications that can be used to create, validate, and/or manage one or more network address translation functions. The network address translation function can be created as a standalone entity by the control system, as a component of a service created and/or managed by the control system, and/or otherwise created by the control system. In some embodiments, the control system can chain the network address translation function to one or more services (or hosts). The network address translation function can include a switch and a network address translation virtual function. The network address translation virtual function can be created, modified, managed, and/or terminated by a service control function and the switch can be created, modified, managed, and/or terminated by a network control function.

The control system can detect a request for a network address translation function. In some embodiments, the control system (or an operations management controller of the control system) can analyze one or more recipes (or policies or rules) to determine how to create the network address translation function. In some embodiments, the control system can access a service creation database to identify one or more "recipes" that can be used to create the network address translation function. The recipes can define service components including hardware, software, and/or transport as well as network address translation functions and/or components of the network address translation functions. The recipes also can specify a network address translation technique or scheme to be applied by the network address translation function.

The control system can access an inventory of resources to determine if resources needed to support the new network address translation function are available. The control system can identify (or create) a service control function that is to control a network address translation virtual function of the network address translation function and a network control function that is to control a switch of the network address translation function. The control system can, via an infrastructure control, instantiate one or more virtual machines and load and validate network address translation functions components (e.g., network address translation virtual functions and/or network address translation switches) to the virtual machines.

According to various embodiments of the concepts and technologies described herein, the infrastructure control can request one or more network addresses from an address management function for use with the network address translation function. Network addresses may or may not be needed, depending upon what approach (e.g., technique or scheme) is used for network address translation, as will be explained in more detail below. The network address translation function also can be configured by network address translation configuration data. The network address translation configuration data can define how the network address translation function will translate addresses, as well as a technique or scheme that will be applied by the network address translation function. The network address translation configuration data can be obtained by the network address translation virtual function via one or more application programming interfaces ("APIs"). The network address translation function can forward this network address translation configuration data to the network control function, and the network control function can configure the network address translation switch including, inter alia, providing routing rules.

According to various embodiments of the concepts and technologies described herein, the network address translation technique can include use of a sub-address. A sub-address can be assigned from an address space associated with an external routing address of the network address translation function. The sub-address can be used to replace a previously used external routing address and other hosts can be updated to reflect the new sub-address. According to another embodiment, the network address translation technique can include use of a new address. The new address can be assigned from an address space associated with an external routing address of the network address translation function. The new address can be used to replace a previously used external routing address and other hosts can be updated to reflect the new sub-address. According to yet another embodiment of the concepts and technologies described herein, the network address translation technique can include use of a transferred address. An internal address for the host can be transferred and used as an external routing address of the network address translation function. A new address can be used to replace the host address. Other hosts may be unaware of this change.

According to one aspect of the concepts and technologies disclosed herein, a system is disclosed. The system can include a processor and a memory. The memory can store computer-executable instructions that, when executed by the processor, cause the processor to perform operations. The operations can include detecting a request to create a network address translation function, analyzing a recipe to identify a network address translation switch and a network address translation virtual function that are to provide functionality of the network address translation function, triggering instantiation of the network address translation switch via a network control function, triggering instantiation of the network address translation virtual function via a service control function, validating the network address translation function, and chaining the network address translation function to a host. The network address translation function can provide address translation for the host using the network address translation switch.

In some embodiments, the computer-executable instructions, when executed by the processor, cause the processor to perform operations further including receiving, via an application programming interface, network address translation configuration data at the network address translation function. In some embodiments, the network address translation switch can be configured by the network address translation configuration data, and the network address translation configuration data can specify a network address translation technique to be applied by the network address translation function.

In some embodiments, the network address translation technique includes assignment of a sub-address to the network address translation function. The sub-address can be used as an external address for the network address translation function and can be assigned from an address space associated with a previous external address of the network address translation function. The sub-address can be obtained from an address management function. In some other embodiments, the network address translation technique includes transfer of a host address from the host to the network address translation function and assignment of a new address to the host. The host address can be used as an external address for the network address translation function, and the new address can be used by the network address translation function as an internal address for the host. The new address can be obtained from an address management function. In yet other embodiments, the network address translation technique can include assignment of a new address to the network address translation function. The new address can be used as an external address for the network address translation function, and the new address can be obtained from an address management function. In some embodiments, the network address translation switch uses a match-action table for routing rules. The match-action table can be provided to the network address translation switch by the network control function.

According to another aspect of the concepts and technologies disclosed herein, a method is disclosed. The method can include detecting, at a control system including a processor, a request to create a network address translation function; analyzing, by the processor, a recipe to identify a network address translation switch and a network address translation virtual function that is to provide functionality of the network address translation function; triggering, by the processor, instantiation of the network address translation switch via a network control function; triggering, by the processor, instantiation of the network address translation virtual function via a service control function; validating, by the processor, the network address translation function; and chaining, by the processor, the network address translation function to a host. The network address translation function can provide address translation for the host using the network address translation switch.

In some embodiments, the method further can include receiving, via an application programming interface, network address translation configuration data at the network address translation function. In some embodiments, the network address translation switch can be configured by the network address translation configuration data, and the network address translation configuration data can specify a network address translation technique to be applied by the network address translation function.

In some embodiments, the network address translation technique includes assignment of a sub-address to the network address translation function. The sub-address can be used as an external address for the network address translation function and can be assigned from an address space associated with a previous external address of the network address translation function. The sub-address can be obtained from an address management function. In some other embodiments, the network address translation technique includes transfer of a host address from the host to the network address translation function and assignment of a new address to the host. The host address can be used as an external address for the network address translation function, and the new address can be used by the network address translation function as an internal address for the host. The new address can be obtained from an address management function. In yet other embodiments, the network address translation technique can include assignment of a new address to the network address translation function. The new address can be used as an external address for the network address translation function, and the new address can be obtained from an address management function.

According to yet another aspect of the concepts and technologies disclosed herein, a computer storage medium is disclosed. The computer storage medium can have computer-executable instructions stored thereon that, when executed by a processor, cause the processor to perform operations. The operations can include detecting a request to create a network address translation function; analyzing a recipe to identify a network address translation switch and a network address translation virtual function that is to provide functionality of the network address translation function; triggering instantiation of the network address translation switch via a network control function; triggering instantiation of the network address translation virtual function via a service control function; validating the network address translation function; and chaining the network address translation function to a host. The network address translation function can provide address translation for the host using the network address translation switch.

In some embodiments, the computer-executable instructions, when executed by the processor, cause the processor to perform operations further including receiving, via an application programming interface, network address translation configuration data at the network address translation function. In some embodiments, the network address translation switch can be configured by the network address translation configuration data, and the network address translation configuration data can specify a network address translation technique to be applied by the network address translation function.

In some embodiments, the network address translation technique includes assignment of a sub-address to the network address translation function. The sub-address can be used as an external address for the network address translation function and can be assigned from an address space associated with a previous external address of the network address translation function. The sub-address can be obtained from an address management function. In some other embodiments, the network address translation technique includes transfer of a host address from the host to the network address translation function and assignment of a new address to the host. The host address can be used as an external address for the network address translation function, and the new address can be used by the network address translation function as an internal address for the host. The new address can be obtained from an address management function. In yet other embodiments, the network address translation technique can include assignment of a new address to the network address translation function. The new address can be used as an external address for the network address translation function, and the new address can be obtained from an address management function. In some embodiments, the network address translation switch uses a match-action table for routing rules. The match-action table can be provided to the network address translation switch by the network control function.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

While some embodiments of the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
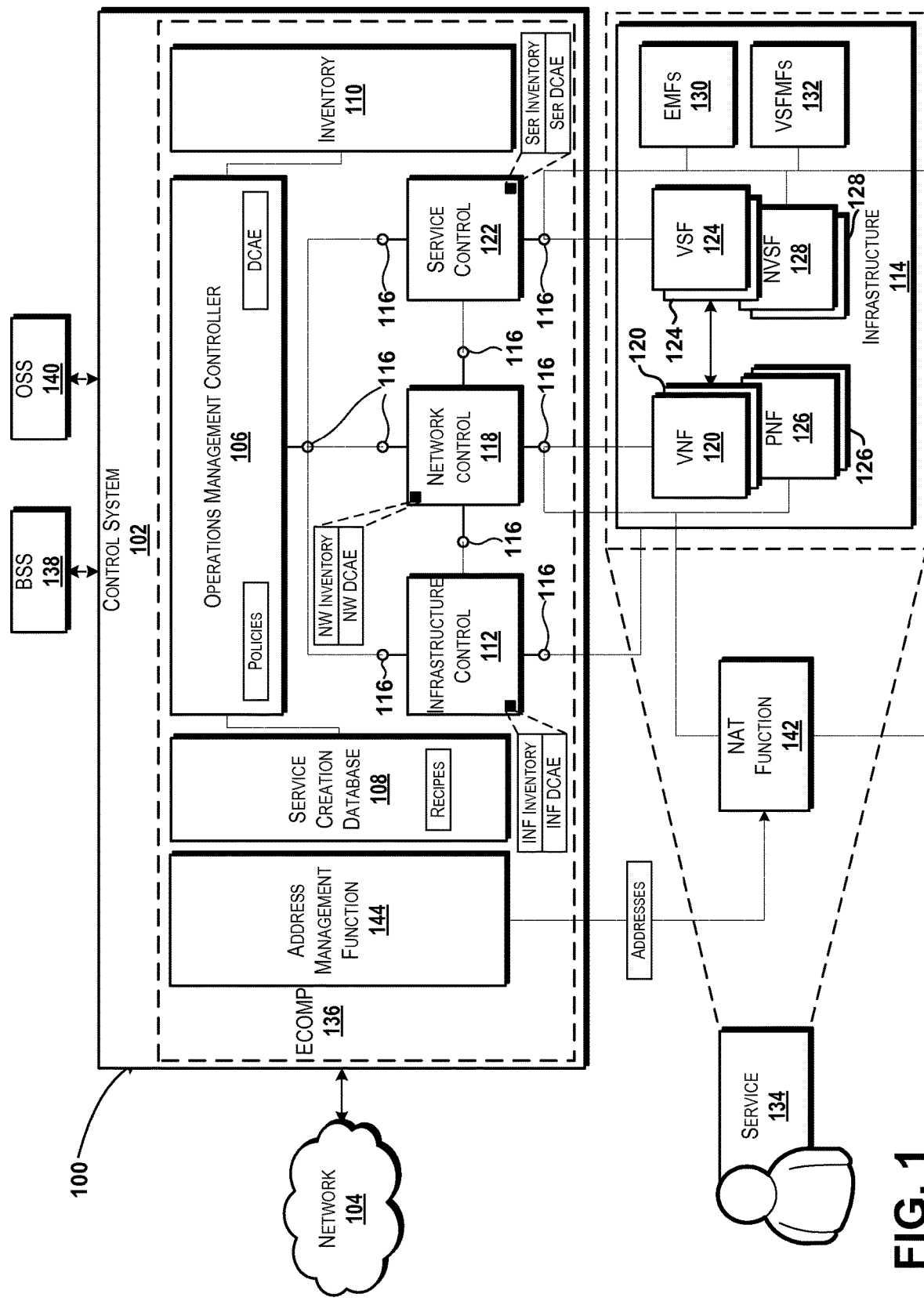
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for providing network address translation in a software defined networking environment will be described, according to an illustrative embodiment. The operating environment 100 shown in FIG. 1 includes a computing device or system (hereinafter referred to as a "control system") 102. The control system 102 can host a network control framework. The control system 102 can operate on, in communication with, and/or as a part of a communications network ("network") 104. Additional aspects of the network 104 are illustrated and described below with reference to FIG. 7. Briefly, it should be understood that the network 104 can include almost any type of computer and/or communication networks.

According to various embodiments, the functionality of the control system 102 may be provided by one or more server computers, workstations, desktop computers, laptop computers, other computing systems, combinations thereof, or the like. In some embodiments, the functionality of the control system 102 can be provided by a distributed computing system that can host processing and/or storage resources that collectively can be configured to provide the functionality illustrated and described herein. Thus, it should be understood that the functionality of the control system 102 can be provided by a single device, by two or more similar devices, and/or by two or more dissimilar devices. For purposes of describing the concepts and technologies disclosed herein, the control system 102 is described herein as including a server computer. It should be understood that this embodiment is illustrative, and should not be construed as being limiting in any way.

The control system 102 can execute an operating system (not shown in FIG. 1) and one or more application programs, modules, or other computer-executable instructions that, when executed by a processor (not shown in FIG. 1) of the control system 102 can provide the functionality illustrated and described herein. The operating system can include a computer program for controlling the operation of the device, and the application programs, modules, or other computer-executable instructions can include executable programs configured to execute on top of the operating system to provide various functions as illustrated and described herein.

Although the control system 102 is illustrated and described in FIG. 1 as including multiple modules, components, and/or other elements, it should be understood that the functionality of these modules, components, and/or elements can be provided by application modules executed by a single device, in some embodiments. In some other embodiments, the functionality of the modules, components, and/or elements can be provided by multiple devices. As such, the illustrated and described embodiment should be understood as being illustrative of one contemplated embodiment of the concepts and technologies described herein and should not be construed as being limiting in any way.

As shown in FIG. 1, the control system 102 can include an operations management controller 106. The operations management controller 106 can be configured to provide control and management of the control system 102 and/or the various elements thereof. According to various embodiments, the operations management controller 106 can provide high level and end-to-end control of services, creation of services, and/or management of services, as well as creation, validation, and/or management of network address translation function elements as will be illustrated and described in further detail herein.

According to various embodiments of the concepts and technologies described herein, the operations management controller 106 can manage services and/or network address translation function elements across multiple "scopes" or "domains." As used herein, a scope, scope domain, and/or domain can be used to refer to aspects of the concepts and technologies described herein and can include, but are not necessarily limited to, an infrastructure scope, a network scope, and a service or application ("service") scope. The operations management controller 106 also can control and orchestrate service creation and management; validation of services and/or service components; as well as creation, management, and validation of network address translation function functionality as will be illustrated and described herein.

The operations management controller 106 can serve as a master service orchestrator ("MSO") for the control system 102. The operations management controller 106 can instantiate new services and/or network address translation functions based upon "recipes" that can be stored in a service creation database 108 or elsewhere as illustrated and described herein. The operations management controller 106 also can use information stored in the inventory 110 when creating new services and/or network address translation functions. As will be explained in more detail hereinbelow, services can include network address translation function functionality, in some embodiments, while in some other embodiments the network address translation function functionality can be embodied by standalone network address translation functions that can be chained to services, located between services, and/or that can operate independently of other services. The operations management controller 106 also can instantiate scope control domain entities (e.g., controllers for infrastructure, network resources, and/or service functions), as will be explained in more detail below.

The operations management controller 106 can handle messages and/or exceptions that can be generated by the operations management controller 106 and/or exceptions that may be passed to the operations management controller 106 from the scope control domain (e.g., the controllers for the infrastructure, network resources, and/or the service functions) as will be illustrated and described below in more detail. In some embodiments, network address translation functions can generate events and/or reports that can be routed to and/or handled by the operations management controller 106 or other entities, as will be illustrated and described in more detail below.

The operations management controller 106 also can run one or more high level data collection, analytics, and event handling ("DCAE") processes to analyze data or events relating to services, network address translation functions, and/or the various components for managing the services, network address translation functions, and/or their associated infrastructure, network, and service components. The operations management controller 106 also can run a policy decision function using a high level set of policies for service creation, control, and/or validation as well as network address translation function creation, control, validation, and the like.

As mentioned above, the service creation database 108 can define products and services using definitions of components of services such as hardware, software, and/or transport that can be referred to herein as "recipes" or "service recipes." The recipes for services can define one or more network address translation functions or components, in some embodiments, while in some other embodiments the network address translation functions and/or components can have network address translation function recipes that can be stored in the service creation database 108. The recipes can specify one or more components of a service and/or a network address translation function, as well as processes or operations for putting the service and/or network address translation function components together.

As such, it can be appreciated that the service and/or network address translation function recipes may involve a service scope (e.g., a set of service or application functions), a network scope (e.g., a set of network functions and/or information indicating how network transport is to be established, maintained, and/or used), and an infrastructure scope (e.g., where on the network 104 or other hardware the network and service functions are to be located). The recipes also can implicitly or explicitly specify whether the various components of the service and/or network address translation function should be chained together or if the components should operate independently of one another. It should be understood that the term "service" as used herein can include an "application." Thus, it should be understood that the term "service" is not used to limit the concepts and technologies described herein in any way. The service creation database 108 can be used by a service provider, by third parties, and/or by customers.

The inventory 110 can maintain or reflect up-to-date information about resource utilization. The information can include a total number of resources, an amount of available resources, an amount of resources in use, or the like. It should be understood that the "resources" can include infrastructure resources, network resources, and/or service resources. Thus, the inventory 110 can be used to understand what resources (in terms of infrastructure, network, and/or service) exist, what resources are in use, and/or what resources are free or available.

According to various embodiments, the inventory 110 can reside entirely within a control domain (e.g., within a service domain, network domain, or infrastructure domain) or elsewhere. For example, in some embodiments the inventory 110 can reside and/or can be represented by an inventory and/or data structure that is hosted by the control system 102, the network 104, and/or elsewhere. Thus, in some embodiments the inventory 110 can include data indicating or reflecting all inventory (infrastructure, network, and service) for the entire network 104 and/or the elements in communication with the network 104. Thus, the inventory 110 can provide end-to-end active view capability for active and/or inactive resources across all scopes of the control system 102.

In some other embodiments, the inventory 110 may be divided across the scope controllers (described in further detail below) so that each controller can have a local inventory that relates to that controller's scope. A controller for the infrastructure domain, for example, can maintain an infrastructure inventory. Similarly, controllers for network and service scopes can maintain scope-specific inventories. Even if scope-specific inventories are provided, the inventory 110 still can provide end-to-end viewing capability for a divided or distributed inventory embodiment, if desired. It should be understood that this example is illustrative and therefore should not be construed as being limiting in any way.

According to various embodiments, the operations management controller 106 can communicate with one or more infrastructure control elements or controllers (collectively referred to herein as "infrastructure control") 112. The infrastructure control 112 can manage assets of network infrastructure ("infrastructure") 114. Thus, the infrastructure control 112 can interact with the infrastructure 114 to instantiate virtual resources such as virtual machines and/or virtual storage devices and/or to allocate hardware resources that will host various service and/or network functions as illustrated and described herein. According to some embodiments, however, the infrastructure control 112 may not manage networking functions and/or service functions, as will be explained in more detail below. It should be noted that "virtual machines" as used herein can include other types of functionality such as, for example, Linux containers, or the like, notwithstanding the fact that Linux containers (e.g., Docker containers) are not equivalent to virtual machines. In particular, containers can be a reasonable substitute for virtual machines, according to various embodiments of the concepts and technologies described herein and therefore should be considered within the scope of this disclosure. In the claims, however, containers are not included in the scope of the term "virtual machines" unless specifically so recited.

The infrastructure control 112 can include and/or can execute a policy engine using an infrastructure set of policies. The infrastructure control 112 also can handle infrastructure scope exceptions, in some embodiments. The infrastructure control 112 can include functionality for managing and orchestrating the infrastructure 114; infrastructure EMFs, which may manage various fault, configuration, accounting, performance, and security ("FCAPS") capabilities; an infrastructure data, collection, analytics, and events ("DCAE") process (labeled as "INF DCAE" in FIG. 1) that can provide information to the controller and/or to the operations management controller 106; a policy decision function with infrastructure scope policies; and/or an infrastructure inventory function (labeled "INF Inventory" in FIG. 1) that can represent infrastructure-scoped inventory and usage information or provide this information to the inventory 110. It should be understood that this example is illustrative and therefore should not be construed as being limiting in any way.

The infrastructure control 112 can receive instructions and/or requests from the operations management controller 106 or other entities via an operations management API 116. As shown in FIG. 1, there can be multiple APIs 116 that can be called or accessed by various elements of the control system 102 to support the functionality illustrated and described herein. Although the APIs 116 are given the same reference numeral in the drawings, it should be understood that one or more (or each) of the APIs 116 can use different technologies (e.g., formats and/or semantics) to support calls to the various elements and/or to support the communications illustrated and described herein. According to some embodiments, the API 116 between the infrastructure control 112 and the operations management controller 106 can correspond to an operations management ("OM") API 116, though this is not necessarily the case.

Similarly, the infrastructure control 112 can communicate with a network control device or controller (hereinafter collectively referred to as the "network control") 118 via an SDN API 116. Thus, it can be appreciated that the infrastructure control 112 and the network control 118 can support SDN and virtualization technologies simultaneously. As will be explained in more detail below, the network control 118 can be configured to create and manage virtual networking functions ("VNFs") 120 within the infrastructure 114. In some instances, the infrastructure control 112 also can load VM images with embedded VNFs 120 (e.g., a virtual switch) in addition to, or instead of, the network control 118. The functionality of the network control 118 will be described in more detail below. The infrastructure control 112 also can load network address translation functions to the VMs and/or can include network address translation function functionality in VM images that can be loaded to the VMs. These and other aspects of creating network address translation functions will be explained in more detail below, particularly with reference to FIGS. 2-6.

The infrastructure control 112 also can communicate with the infrastructure 114 via an API 116. Thus, the infrastructure control 112 can interact with the infrastructure 114 to instantiate resources and/or allocate hardware to support various functions as illustrated and described herein. In addition to supporting the VNFs 120, the infrastructure 114 also can interact with a service control device or controller (hereinafter collectively referred to as the "service control") 122 to receive instructions for instantiating one or more virtual service functions ("VSFs") 124 within the infrastructure 114 as well as receive instructions for instantiating one or more network address translation functions and/or network address translation function components as will be illustrated and described in more detail below. A VSF 124 can include a virtualized application or application component, and can be used to create other services of various types including, but not limited to, basic services, segmented services, and/or composite services. The functionality of the service control 122 and creation of various types of services using the service control 122 will be described in more detail below.

The operations management controller 106 also can communicate with the network control 118. The network control 118 can be responsible for management, deployment, operation, and coordination of a transport network for a particular service and/or network address translation function. According to various embodiments, the transport network between one or more components of a service and/or network address translation function components can be created by creating a group of one or more VNFs 120 within the infrastructure 114. The transport network also can include physical network functions ("PNFs") 126, which can be selected from an available inventory of physical resources, configured, and/or controlled by the network control 118.

The transport network can include various VNFs 120, PNFs 126, and/or other networking functions. The PNFs 126 can include, for example, European Telecommunications Standards Institute PNFs ("ETSI PNFs"). In some embodiments, the transport network may include other types of networking functions such as leaf switches, spine switches, or the like, while in some other embodiments, leaf switches and/or spine switches may be considered part of the infrastructure 114. The VNFs 120 can include virtualized network functions that can exist in the network scope. Thus, according to various embodiments, the VNFs 120 can include virtual switches ("vSwitches"), virtualized routing functions and/or virtual routers, a virtual tap, or the like. Because the transport network can include other types of functions, it should be understood that these examples are illustrative and therefore should not be construed as being limiting in any way.

The network control 118 also can establish and manage software defined networks, maintain a network scope resource inventory, run a network scope data collection and analysis process, run a policy engine using a network scope set of policies, and handle network scope exceptions. The network control 118 can include a software defined network controller; one or more virtual network function management functions; one or more network element management functions, which can manage FCAPS for network scoped services; a network DCAE process (labeled as "NW DCAE" in FIG. 1), which can provide information to the network control 118 and/or the operations management controller 106; a network policy engine with network scope policies; and a network inventory function (labeled as "NW Inventory" in FIG. 1), which can provide network scoped inventory and usage information to the inventory 110.

According to various embodiments, the network control 118 can receive requests from the operations management controller 106 via an API 116 such as the OM API 116 discussed above. The requests from the operations management controller 106 received via the OM API 116 can instruct the network control 118 to create, modify, and/or terminate one or more networking functions such as VNFs 120, PNFs 126, and/or some infrastructure networking functions, if controlled or controllable by the network control 118. The network control 118 also can be instructed by the service control 122 and/or the operations management controller 106 to create, modify, and/or terminate one or more network address translation function components such as a switch (not shown in FIG. 1). The creation, configuration, and validation of the switch will be illustrated and described in more detail below, particularly with reference to FIGS. 4-6. Briefly, however, it should be noted that the switches illustrated and described herein can include virtual switches (e.g., open virtual switches ("OVS") or other vSwitches) and/or other OpenFlow switches and/or physical switches. Thus, the term "switch" includes virtual switches and physical switches unless modified by the terms "virtual," "physical," or other modifiers. These infrastructure networking functions can include network hardware (e.g., switches, leaf switches and spine switches, or the like) and other infrastructure networking functions. Some other infrastructure networking functions (e.g., wires, physical ports, switches, leaf switches and spine switches (if not controlled by network control 118), or the like) can be considered a part of the infrastructure 114. The network control 118 also can be configured to receive instructions to establish or modify transport using VNFs 120 and/or PNFs 126 in addition to, or instead of, instantiating the VNFs 120 and/or the PNFs 126. It should be understood that this example is illustrative and therefore should not be construed as being limiting in any way.

The network control 118 also can initiate requests to the infrastructure control 112 via the OM API 116 to request and/or obtain additional network resources. For example, the network control 118 can request the infrastructure control 112 to allocate one or more virtual machines ("VMs") and load an image with an embedded VNF 120 to the VM. The network control 118 also can receive requests via an SDN API 116 from infrastructure control 112 to create, modify, and/or terminate transport. Thus, it can be appreciated that the network control 118 can support SDN and virtualization technologies simultaneously. It should be understood that this example is illustrative and therefore should not be construed as being limiting in any way.

The operations management controller 106 also can communicate with the service control 122. The service control 122 can be responsible for management, deployment, operation, and coordination of services. Services can be provided by and/or can include one or more VSFs 124, non-virtualized service functions ("NVSFs") 128, one or more EMFs 130, one or more VSF management functions (labeled "VSFMFs" in FIG. 1) 132, combinations thereof, or the like.

According to various embodiments, the services, service components, network address translation functions, and/or network address translation function components can be created by the service control 122 by creating a group of one or more VSFs 124, NVSFs 128, and/or network address translation virtual functions (not shown in FIG. 1) within the infrastructure 114. Thus, it should be understood that the NVSFs 128 can be created and/or controlled by the service control 122. It also should be understood that the operations management controller 106 can create or prompt creation of the VSFs 124 and initiate requests to the infrastructure 114 and network control 118. As such, it should be understood that the operations management controller 106 and/or the service control 122 can create a service, and/or a network address translation virtual function, depending upon a degree of delegation awarded to the service control 122 by the operations management controller 106 when the operations management controller 106 created the service control 122.

According to various embodiments, the service control 122 also can maintain a service scope resource inventory (labeled "Ser Inventory" in FIG. 1). The service scope resource inventory can be maintained at the service control 122, in some embodiments, and can provide service scope resource inventory and usage information to the inventory 110. The service control 122 can also run a service scope DCAE (labeled as "Ser DCAE" in FIG. 1) to analyze messages and/or events occurring within or relating to services, service components, and/or service functions such as the VSFs 124 and the NVSFs 128.

The service control 122 also can run a policy engine for a service scope set of policies. Thus, service-specific policies can be applied and/or used by the service control 122 when creating services, service components, and/or service functions such as the VSFs 124 and/or the NVSFs 128; as well as network address translation functions and/or network address translation function components as will be illustrated and described in more detail below. The service control 122 also can handle service scope exceptions, in some embodiments. As noted above, the operations management controller 106 also can create services, service components, service functions, network address translation functions, and/or network address translation function components depending upon the degree to which the operations management controller 106 delegates control to the service control 122. It should be understood that these example components of the service control 122 are illustrative and therefore should not be construed as being limiting in any way.

The service control 122 can be responsible for management and control of services, components or functions of the services, network address translation functions, and/or components of the network address translation functions. According to various embodiments, the service control 122 can manage VSFs 124 and/or NVSFs 128 of services being controlled as well as components of the network address translation functions illustrated and described herein. The service control 122 also can handle service EMFs, which can manage FCAPS for services being controlled. The service DCAE process can provide information to the service control 122 and/or the operations management controller 106.

The service control 122 also can include a service policy engine, which can apply and/or enforce service scope policies. The service inventory can provide service scope inventory and/or usage information to the inventory 110.

According to various embodiments, the service control 122 can receive requests from the operations management controller 106 via an API 116 such as the OM API 116 discussed above. The requests from the operations management controller 106 received via the OM API 116 can instruct the service control 122 to create, modify, and/or terminate one or more service functions such as VSFs 124, the NVSFs 128, and the like, as well as to create, modify, and/or terminate one or more network address translation functions and/or network address translation function components. It should be understood that this example is illustrative and therefore should not be construed as being limiting in any way.

The service control 122 also can initiate requests to the infrastructure control 112 via the OM API 116 to request and/or obtain additional infrastructure resources and/or other resources. The service control 122 also can initiate requests via an SDN API 116 to the network control 118. Thus, it can be appreciated that the service control 122 can support SDN and virtualization technologies simultaneously. These requests can be configured to request creation, modification, and/or termination of service-related transport, network functions associated with a network address translation function, and/or network address translation function transport (e.g., transport between components of the network address translation functions). It should be understood that this example is illustrative and therefore should not be construed as being limiting in any way.

The APIs 116 illustrated and described herein can include two or more types of APIs 116. In some embodiments, as mentioned above, the APIs 116 can include an OM API 116 and/or SDN APIs 116. The APIs 116 can be exposed by some or all of the components within the control system 102. The APIs 116 can be exposed by the components to each other, for various purposes. For example, the APIs 116 can include an operations management API 116, which can be exposed by the operations management controller 106; infrastructure APIs 116, which can be exposed by the infrastructure control 112; network APIs 116, which can be exposed by the network control 118; and service APIs 116, which can be exposed by the service control 122. Thus, it can be appreciated that the control system 102 and the components thereof can support SDN and virtualization technologies simultaneously.

The APIs 116 can be used to enable operational management within the control system 102 and between the control system 102 and the infrastructure 114. The APIs 116 can be exposed in either direction. As such, the APIs 116 can be exposed in a southbound direction, e.g., from the operations management controller 106 to the infrastructure control 112, the network control 118, or the service control 122; from the infrastructure control 112 to the infrastructure 114; from the network control 118 to the VNFs 120 loaded to the infrastructure 114; and/or from the service control 122 to the VSFs 124 loaded to the infrastructure 114. The APIs 116 also can enable communications in a northbound direction, e.g., the APIs 116 can enable the VNFs 120 to access the network control 118; the VSFs 124 to access or communicate with the service control 122; and the infrastructure 114 to access the infrastructure control 112. Similarly, the APIs 116 can be accessed by the infrastructure control 112, the network control 118, and/or the service control 122 to enable access to the operations management controller 106. It should be understood that this example is illustrative and therefore should not be construed as being limiting in any way.

The SDN APIs 116 can be exposed by the network control 118 to the operations management controller 106, the infrastructure control 112, and the service control 122. The SDN APIs 116 can enable the operations management controller 106, the infrastructure control 112, and the service control 122 to make requests to the network control 118 for SDN services. It should be understood that this example is illustrative and therefore should not be construed as being limiting in any way.

By creating, allocating, and/or instantiating the VNFs 120, the PNFs 126, the VSFs 124 the NVSFs 128, the EMFs 130, the VSF management functions 132, and/or combinations thereof, the control system 102 can create a service 134 on the infrastructure 114. It should be understood that this example is illustrative and therefore should not be construed as being limiting in any way.

According to various embodiments, the control system 102 can integrate an enhanced control, orchestration, management, and policy framework (hereinafter referred to as "ECOMP") 136, which can be integrated into the control system 102. The ECOMP 136 can enable rapid service creation by combining pre-built components and/or functions. The ECOMP 136 also can enable dynamically elastic capacity management by enabling scaling and instantiation. The ECOMP 136 also can support control functions. The control functions can be driven by real-time analytics and policy decisions.

The ECOMP 136 also can support unified operations, administration, and management across the three scopes (e.g., infrastructure, network, and service). The ECOMP 136 also can support optimization of network address translation functions and/or services 134 and/or the components of the network address translation functions and/or services 134, analytics of the network address translation functions and/or the services 134, components thereof, and/or the various components of the control system 102. As illustrated and described in the FIGURES, the ECOMP 136 can be an element of the control system 102, in some embodiments, while in other embodiments the control system 102 can correspond to an embodiment of the ECOMP 136. It should be understood that these examples are illustrative and therefore should not be construed as being limiting in any way.

The ECOMP 136 can include a service design and creation ("SDC") environment, an active and available inventory ("AAI"), an operations management framework ("OMF"), and/or a service, infrastructure, and/or network control. Thus, the ECOMP 136 can include, in some embodiments, the service creation database 108, the inventory 110, the operations management controller 106, and/or one or more of the infrastructure control 112, the network control 118, and/or the service control 122. It should be understood that this example is illustrative and therefore should not be construed as being limiting in any way.

The SDC component of the ECOMP 136 can enable developers, service designers, network planners/engineers, operations planners and product managers, other entities, or the like, to create, organize, prototype, and deploy services 134. In some embodiments, service definitions can be instantiated by the OMF and the resulting service instances can be recorded in the AAI. According to various embodiments, components associated with a service 134 can be created in the SDC component and stored as recipes. Thus, the SDC component can store recipes for VSF components, VSFs 124, service components, network address translation functions, network address translation function components, and various network and/or infrastructure resources. The recipes also can indicate whether or not various components of the network address translation functions and/or the services 134 are to be chained together or are to operate independently of one another. It should be understood that this example is illustrative and therefore should not be construed as being limiting in any way.

The AAI can provide real-time views of services, infrastructure, and networks in aggregate. The AAI can obtain the data from the service control 122 and the network control 118, and/or can supplement views with customer and account data. The OMF can provide and extend upon FCAPS capabilities through the use of analytics, policy, orchestration, and control functions. The OMF can be a repeating pattern of control, orchestration, DCAE, and policy management functions. It should be understood that this example is illustrative and therefore should not be construed as being limiting in any way.

In some embodiments, the OMF and service, infrastructure, and network control functions can form a series of closed loop control capabilities. These capabilities can be referred to as "operational control loops." These "operational control loops" can be based on data and events collected and analyzed via the DCAE. Responsive actions can be based upon policy, and may be taken by one or more of orchestration or controller functions. "Operational control loops" can be repeating patterns that may be implemented in various locations and supporting various scopes of operation.

In some embodiments, the OMF can interact with one or more business support system ("BSS") 138 and one or more operations support system ("OSS") 140. The BSS 138 and the OSS 140 can be external to the ECOMP 136, in some embodiments. The BSS 138 and the OSS 140 can interact with customers and operations in support of activities and aggregate capabilities across services within and outside of the operating environment 100.

Each instantiation of the OMF can be specifically tailored to the scope in which the OMF operates. The OMF may exist as a top-level end-to-end function that can be separate from service, infrastructure, and network control, and the platform components of the OMF may exist in various places within service and network control. It should be understood that this example is illustrative and therefore should not be construed as being limiting in any way.

As mentioned above, although the operations management controller 106, the service creation database 108, the inventory 110, the infrastructure control 112, the network control 118, the service control 122, and the ECOMP 136 are illustrated as components of the control system 102, it should be understood that each of these components, or combinations thereof, may be embodied as or in stand-alone devices or components thereof operating as part of or in communication with the network 104 and/or the control system 102. Thus, for example one or more of these components can be hosted by a server computer or other computing device that can access other devices via one or more of the APIs 116, and/or can be accessed via one or more of the APIs 116. As such, the illustrated embodiment should be understood as being illustrative of only some contemplated embodiments and should not be construed as being limiting in any way.

As shown in FIG. 1, the control system 102 also can be used to create, validate, and/or manage one or more network address translation functions 142. The network address translation function 142 can be created as a service 134, as a component of the service 134, and/or as an independent function or application as illustrated and described herein. According to various embodiments of the concepts and technologies described herein, as will be more clearly understood with reference to FIGS. 2-6 below, the functionality of the network address translation function 142 for translating addresses can be performed by a switch (e.g. a virtual switch) and therefore may occur in the transport layer of the operating environment 100. In some other embodiments, one or more portions or elements of the network address translation function 142 can operate in the application or service layer. Thus, the network address translation function 142 can include one or more VNFs 120 and/or one or more VSFs 124. It should be understood that this example is illustrative and therefore should not be construed as being limiting in any way.

The control system 102 can be configured to chain the network address translation function 142 to other services 134, in some embodiments, or to create the network address translation function 142 independently of any service 134. According to various embodiments of the concepts and technologies described herein, the network address translation function 142 is not created as part of any other application or service. Thus, the network address translation function 142 can be chained to services 134 after creation and/or at other times. As such, it can be appreciated that the network address translation function 142 may be chained to one or more VSFs 124 and/or other virtualized service or application functions. Thus, in various embodiments, the network address translation function 142 can be created as a standalone component that can provide the functionality illustrated and described herein for providing a network address translation function in a virtualized environment without being created as a part of a service 134, or the network address translation function 142 can be created as a part or component of a service 134. It should be understood that these examples are illustrative and therefore should not be construed as being limiting in any way.

Figure 2:
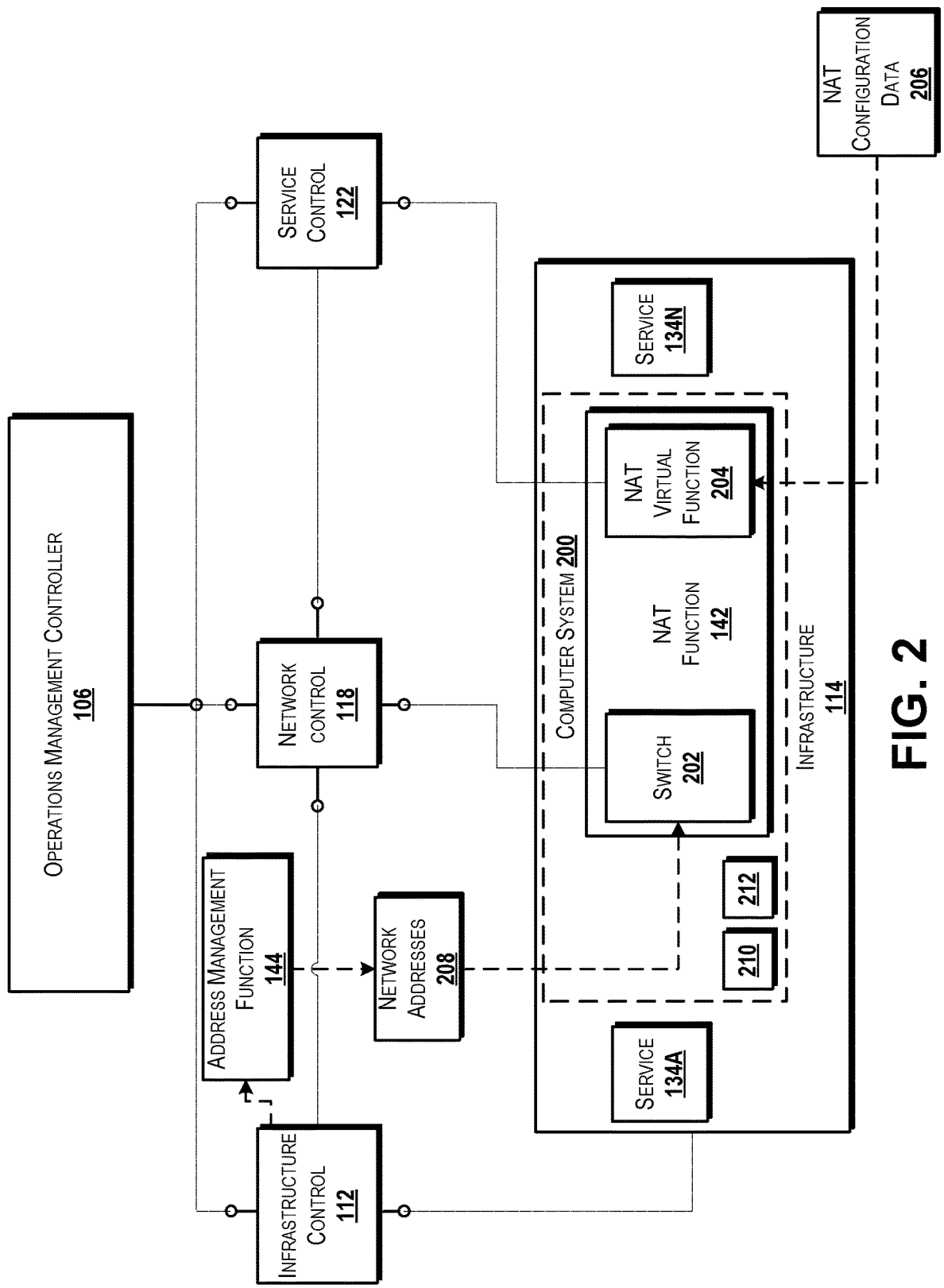
FIG. 2 is a system diagram illustrating additional aspects of various embodiments of the concepts and technologies described herein.

The components of the network address translation function 142 will be illustrated and described in more detail herein, particularly with reference to FIG. 2. Briefly, embodiments of the concepts and technologies described herein provide a network address translation function 142 through creation, instantiation, and/or activation of a switch (a network address translation switch) and a virtual function (a network address translation virtual function). The network address translation function 142 can be created and chained to one or more hosts. As used herein and in the claims, the phrase "network address translation function" refers to functionality that can be used to translate network addresses of hosts and/or other functionality. It should be understood that this example is illustrative and therefore should not be construed as being limiting in any way.

By creating a network address translation function 142 in this manner (without necessarily tying the network address translation functionality to other services 134 at creation and/or without necessarily creating the network address translation functionality as part of a service 134), the concepts and technologies described herein can be used to enable creation of network address translation functions 142 using the same template repeatedly; to insert network address translation functionality into a network or service (e.g., to add network address translation to an existing service 134); and/or otherwise to create network address translation functionality independently of other services 134. Thus, when a request for network address translation functionality is received, the concepts and technologies described herein can enable creation of a network address translation function 142 based on a single recipe or template, thereby streamlining the creation of the network address translation function 142 and possibly obviating heavy involvement by the service control 122 and/or other application creation entities. It should be understood that this example is illustrative and therefore should not be construed as being limiting in any way.

As will be explained in more detail below, the network address translation virtual function can be configured, in some embodiments, to forward configuration information to a network control function, which in turn can configure the switch to provide the functionality illustrated and described herein for the network address translation function 142. Thus, the network address translation virtual function and/or other components of the application layer may not be involved in the actual translating of network addresses. Rather, these functions of the network address translation function 142 can be performed in the transport layer by the switch. Thus, the functionality of the network address translation function 142 may not be incorporated into the services 134 and/or built into applications. Rather, as noted above, the functionality of the network address translation function 142 can be provided by the switch, as will be explained in more detail below.

According to various embodiments, the network address translation virtual function can be created, modified, managed, and/or terminated by the service control 122 and the switch can be created, modified, managed, and/or terminated by the network control 118. Again, as noted above, the functionality of the network address translation function 142 can primarily be performed by the switch in the transport layer (and not at the application or service layer), which can be controlled by the network control 118. Thus, the network address translation function 142 can operate independently of service control functions associated with other services 134, though traffic from other services 134 and/or hosts will be routed to the network address translation function 142. In some embodiments, the network address translation function 142 can be located between multiple services 134. The configuration of these and other components of the network address translation function 142 will be illustrated and described in more detail below.

As shown in FIG. 1, various embodiments of the operating environment 100 can include one or more address management functions 144. The address management function 144 can be configured to create and manage network addresses, to assign and/or re-assign network addresses, to provide various types of addresses, and to perform other address management operations. The network addresses created and managed by the address management function 144 can include network addresses that will be assigned to hosts that communicate with the network address translation function 142, assigned to provide external routing addresses for switches associated with the network address translation function 142, and/or network addresses that otherwise may be used by the network address translation function 142. As will be explained in more detail below, the address management function 144 can be configured to provide the network address translation function 142 with batches of addresses and/or single addresses, to create and/or provide new network addresses to the network address translation function 142, to create and pre-assign and/or pre-allocate the network addresses to a particular network address translation function 142, to recycle and/or reuse existing network addresses, and/or otherwise to create, manage, and/or provide network addresses. These and other aspects of network address creation and management by the address management function 144 will be illustrated and described in more detail below, particularly with reference to FIGS. 2-6.

In practice, the operations management controller 106 can detect a request for a network address translation function 142. For example, the operations management controller 106 can detect a request to modify (e.g., configure or reconfigure) a network address translation function 142, a request to activate a network address translation function 142, a request to scale a network address translation function 142, and/or a request to create or instantiate a new network address translation function 142. In some embodiments of creating network address translation functions 142, the operations management controller 106 can analyze one or more policies to determine how the creation of the network address translation function 142 should be handled.

The operations management controller 106 also can access the service creation database 108 to identify one or more "recipes" that can be used to create the network address translation function 142. The recipes can define hardware, software, and/or transport of the network address translation functions 142 and/or components of the network address translation functions 142. The recipes also can define whether the network address translation functions 142 are to be created between two or more services 134 and/or if the network address translation function 142 is to be created as a standalone or independent network address translation function 142. The recipes also can define what technique, approach, or scheme of network address translation is to be used by the requested network address translation function 142. Three example techniques for providing network address translation will be illustrated and described in detail below, particularly with reference to FIGS. 3A-3D.

The operations management controller 106 can access the inventory 110 to determine if the resources needed to support the new network address translation function 142 are available for use. The operations management controller 106 also can identify a service control function that is to control the network address translation function 142 and allocate or create the service control function. Thus, the operations management controller 106 can select, allocate, and/or create the service control function that is to control the network address translation function 142, or at least a virtual function of the network address translation function 142.

The operations management controller 106 can instruct the infrastructure control 112 to instantiate one or more VMs and switches and to load and validate components of the network address translation function 142 (e.g., network address translation virtual functions and/or switches) to the VMs. It should be understood that the infrastructure control 112 can also instruct the network control 118 to create or establish transport between the components of the network address translation function 142 and/or the VMs, the VNFs 120, the VSFs 124, and/or the service control 122. In a case of terminating a network address translation function 142, it can be appreciated that the network control 118 may de-allocate or tear down transport. The network control 118 can report events to the network DCAE and/or update the network inventory (and/or the inventory 110).

The service control 122 can receive instructions from the operations management controller 106 to instantiate or tear down one or more network address translation virtual functions, in some embodiments. The service control 122 can report an event to a service DCAE and update the service inventory (and/or the inventory 110). The network control 118 also can receive instructions to establish transport between the new network address translation virtual functions and report events to the network DCAE if instantiating a network address translation function 142, or can tear down network transport supporting network address translation virtual functions and report events to the network DCAE if terminating a network address translation function 142. The network control 118 can establish transport using VNFs 120 and/or PNFs 126. The operations management controller 106 can validate the network address translation function 142 end-to-end and/or update the inventory 110.

According to various embodiments of the concepts and technologies described herein, the network address translation function 142 can be configured by network address translation configuration data (not visible in FIG. 1). The network address translation configuration data can define how the network address translation function 142 will operate, what technique of network address translation will be used, what hosts or other devices or entities will access the network address translation function 142, combinations thereof, or the like. According to various embodiments, the network address translation function 142 can be configured by network address translation configuration data that can be obtained via one or more APIs. In particular, a virtual function of the network address translation function 142 can receive the network address translation configuration data and forward the network address translation data to a network control 118. The network control 118 can configure the network address translation switch based on the network address translation configuration data. It should be understood that this example is illustrative and therefore should not be construed as being limiting in any way.

According to various embodiments, the network address translation virtual function of a network address translation function 142 can request and obtain one or more addresses from the address management function 144. The network address translation function 142 can manage the network addresses (e.g., bind the network addresses to hosts or other entities, assign the network addresses to specific components, etc.). The network control 118 also can be configured to control a switch associated with the network address translation function 142, either directly or via the service control 122. Thus, the network address translation function 142 can be configured via configuration data obtained via an API and/or via SDN configuration data, which can be directly or indirectly used to configure the switch of the network address translation function 142 as noted above. These and other aspects of the network address translation functions 142 will be illustrated and described in more detail below.

FIG. 1 illustrates one control system 102, one network 104, one operations management controller 106, one service creation database 108, one inventory 110, one infrastructure control 112, one instance of infrastructure 114, one network control 118, one service control 122, one service 134, one ECOMP 136, one BSS 138, one OSS 140, one network address translation function 142, and one address management function 144. It should be understood, however, that various implementations of the operating environment 100 can include zero, one, or more than one control system 102; zero, one, or more than one network 104; zero, one, or more than one operations management controller 106; zero, one, or more than one service creation database 108; zero, one, or more than one inventory 110; zero, one, or more than one infrastructure control 112; zero, one, or more than one instance of infrastructure 114; zero, one, or more than one network control 118; zero, one, or more than one service control 122; zero, one, or more than one service 134; zero, one, or more than one ECOMP 136; zero, one, or more than one BSS 138; zero, one, or more than one OSS 140; zero, one, or more than one network address translation functions 142; and/or zero, one, or more than one address management functions 144. As such, the illustrated embodiment should be understood as being illustrative, and should not be construed as being limiting in any way.

Turning now to FIG. 2, additional aspects of the network address translation function 142 are illustrated and described in detail. As noted above, the switch illustrated and described herein with reference to FIG. 2 can include a physical switch or virtual switch as host systems (e.g., by using a hypervisor) can omit a virtual switch and the concepts and technologies described herein for network address translation can be implemented using physical switches. In particular, FIG. 2 shows the network address translation function 142 operating on the infrastructure 114. According to some embodiments, as shown in FIG. 2, the network address translation function 142 can be hosted and/or executed by a computer system 200. Although multiple services 134A-N (hereinafter collectively and/or generically referred to as "services 134") are shown as being executed and/or hosted by the same infrastructure 114 that hosts or includes the computer system 200, this is not necessarily the case. In particular, the services 134 and/or the network address translation functions 142 can be hosted and/or executed by different devices and/or infrastructure 114 in various embodiments, while in some other embodiments, the infrastructure 114 can host only a single service 134. As such, the illustrated embodiment should be understood as being illustrative and therefore should not be construed as being limiting in any way.

The network address translation function 142 can include multiple components, in some embodiments, as explained above and as shown in FIG. 2. In particular, the network address translation function 142 can include a network address translation switch 202 (labeled "switch" in FIG. 2) and a network address translation virtual function 204 (labeled "NAT virtual function" in FIG. 2). As explained above, the network address translation function 142 can be configured by way of the network address translation configuration data 206 (labeled "NAT configuration data" in FIG. 2). The network address translation switch 202, the network address translation virtual function 204, and the network address translation configuration data 206 will be described in additional detail below, as will other elements shown in FIG. 2.

The network address translation switch 202 can include a physical switch ("pSwitch") or a virtual switch ("vSwitch"). Thus, it can be appreciated that the network address translation switch 202 can be created and/or controlled by one or more network control functions, which can be included in the network control 118 illustrated and described above with reference to FIG. 1. The network address translation switch 202 can perform network address translation functionality at the transport layer. Thus, the network address translation switch 202 can translate network addresses, inspect headings of packets for traffic that includes addresses that should be translated, maintain mappings of network addresses, forward data to mapped addresses, and the like.

According to various embodiments of the concepts and technologies described herein, the network address translation function 142 can request, obtain, and use multiple network addresses 208. According to various embodiments of the concepts and technologies described herein, the network address translation function 142 can obtain the network addresses 208 from one or more address management functions 144. In some embodiments, the infrastructure control 112 can be configured to trigger creation and/or providing of the network addresses 208 to the network address translation function 142, though this is not necessarily the case. It should be appreciated that the network address translation switch 202 can be instantiated by the operations management controller 106 or other entities, according to various embodiments.

According to various embodiments of the concepts and technologies described herein, the network address translation switch 202 can be configured by SDN configuration data, which in some embodiments can be created, forwarded, and/or relayed to the network address translation switch 202 via the network control 118. In some embodiments, the SDN configuration data can be generated by the network address translation virtual function 204, as will be explained below, and routed to the network control 118 by the network address translation virtual function 204 directly and/or via the service control 122. Thus, the network address translation virtual function 204 can tailor functionality of the network address translation switch 202 via the SDN configuration data in some embodiments. It should be understood that this example is illustrative and therefore should not be construed as being limiting in any way.

According to various embodiments of the concepts and technologies described herein, the network address translation virtual function 204 can be provided to receive configuration information (e.g., the network address translation configuration data 206). The network address translation configuration data 206 can be provided by a user of the network address translation function 142 and/or other entities. The network address translation virtual function 204 also can forward the network address translation configuration data 206 to the network control 118. According to various embodiments of the concepts and technologies described herein, a network address translation function API (not visible in FIG. 2) can be exposed by the network address translation virtual function 204, and the network address translation configuration data 206 can be received via this or other APIs. It should be understood that this example is illustrative and therefore should not be construed as being limiting in any way.

As mentioned above, the network address translation virtual function 204 can forward the network address translation configuration data 206 to the network control 118 directly or via the service control 122 for generation of the SDN configuration data at the service control 122 and/or at the network control 118. The network address translation virtual function 204 therefore can, by way of prompting generation of the SDN configuration data, instruct a network control function of the network control 118 to configure the network address translation switch 202 by way of SDN configuration data. Thus, the network address translation virtual function 204 can effectively instruct the network control function to configure the network address translation switch 202. In some embodiments, the network address translation virtual function 204 can provide SDN configuration data directly to the network control 118 while in some other embodiments, the network address translation virtual function 204 can provide SDN configuration data to the service control 122 for routing to the network control 118.

Thus, the network address translation configuration data 206 can be used to define how the network address translation function 142 will provide network address translation. The network address translation configuration data 206 can include instructions that describe what technique will be used for network address translation (more details regarding three example techniques for providing network address translation will be illustrated and described in detail with reference to FIGS. 3A-3D below); what hosts or other entities will be subject to (and/or can access) the network address translation functionality of the network address translation function 142; what network addresses 208 will be used for the network address translation; combinations thereof; or the like.

As mentioned above, the network address translation configuration data 206 can be provided to the network address translation virtual function 204 via an API exposed by the network address translation virtual function 204. In some other embodiments, the API can be exposed by a system that executes or hosts the network address translation function 142, other devices, combinations thereof, or the like. Therefore, it can be appreciated that the network address translation function 142 can be configured remotely. It should be understood that this example is illustrative and therefore should not be construed as being limiting in any way.

As shown in FIG. 2, the network address translation function 142 and/or the infrastructure 114 that hosts the network address translation function 142 can be hosted or executed by the computer system 200. The computer system 200 can include a memory 210 and a processor 212. The computer system 200 can, via execution of computer-executable instructions stored in the memory 210 by the processor 212, perform operations to provide the functionality illustrated and described herein with reference to the network address translation function 142. Various methods or processes associated with the network address translation function 142 are illustrated and described herein, particularly with reference to FIGS. 4-6. An example architecture of the computer system 200 is illustrated and described herein with reference to FIG. 8. It should be understood that these examples are illustrative and therefore should not be construed as being limiting in any way.

As shown in FIG. 2, the network address translation function 142 can be created as a standalone function. The network address translation function 142 can be created and then chained to one or more services 134. Thus, the network address translation function 142 can have its own service control function and can be chained to other services 134 by the MSO, if desired, but may not be created as a component of another service 134. According to various embodiments, the network address translation function 142 can be chained to services 134 by inserting the network address translation function 142 between a first service 134A and an Nth service 134N.

According to various embodiments, the operations management controller 106 (which can include functionality associated with an MSO in various embodiments) can insert the network address translation function 142 between the two or more services 134 using an SDN controlled switch such as the network address translation switch 202. It should be understood that this example is illustrative and therefore should not be construed as being limiting in any way.

In some embodiments, the network address translation function 142 can be configured to support a "learning mode." In the learning mode, the network address translation function 142 can be configured to collect information relating to a topology of the network 104 and/or a portion thereof such as the operating environment 100, a data center, combinations thereof, or the like. In another embodiment, the network address translation virtual function 204 can support a test and verification mode. In the test and verification mode, the network address translation virtual function 204 can test/or verify the network address translation function 142 and/or cause another entity (e.g., the network control 118) to generate traffic to the network address translation function 142 for the purpose of verifying operation of the network address translation function 142 and/or for other purposes. It should be understood that these examples are illustrative and therefore should not be construed as being limiting in any way.

The network address translation switch 202 can be configured to inspect headers of traffic to identify packets that require translation. The network address translation switch 202 can apply the translation using match-action tables or other data structures that can represent routing rules. According to various embodiments, the match-action tables or other data structures can be generated and/or provided by the network control 118, though this is not necessarily the case. The match-action tables or other data structures can be updated based on the network address translation configuration data 206, which can be provided to the network control 118 by the network address translation virtual function 204, as well as network addresses 208 provided by the address management function 144. It should be understood that these examples are illustrative and therefore should not be construed as being limiting in any way.

Figure 3A:
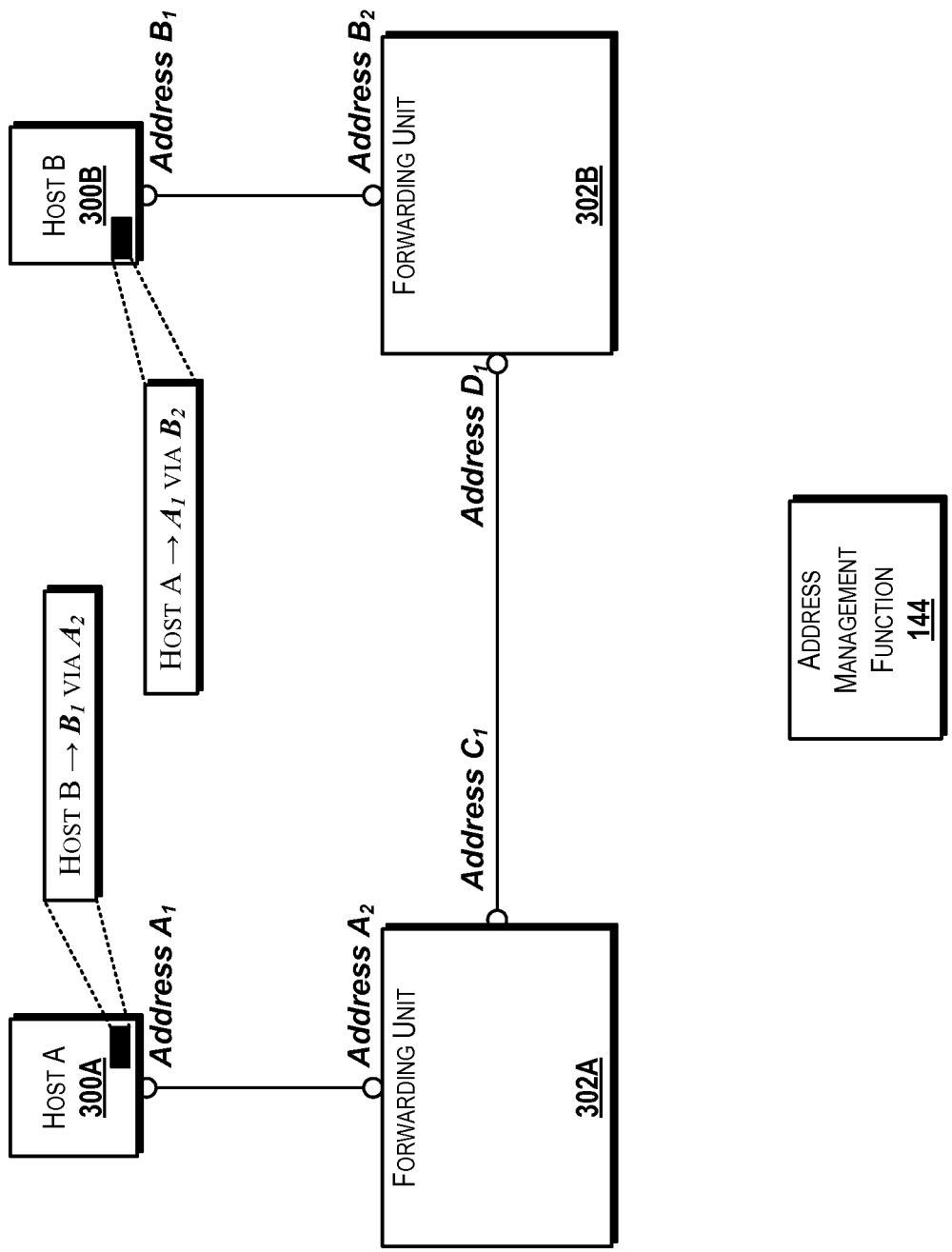
FIGS. 3A-3D are system diagrams illustrating three example techniques for providing network address translation, according to some example embodiments of the concepts and technologies described herein.
Figure 3B:
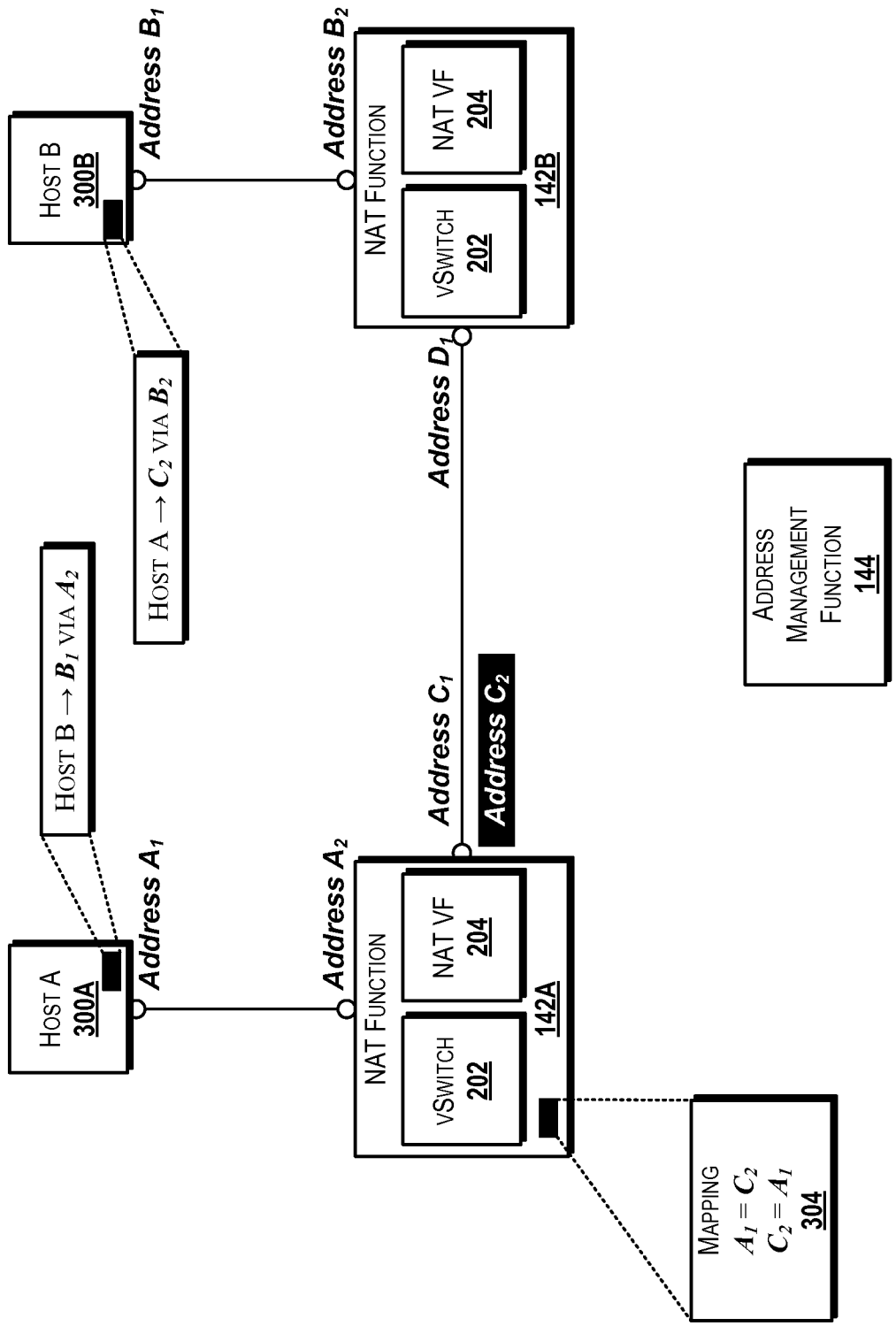
Figure 3C:
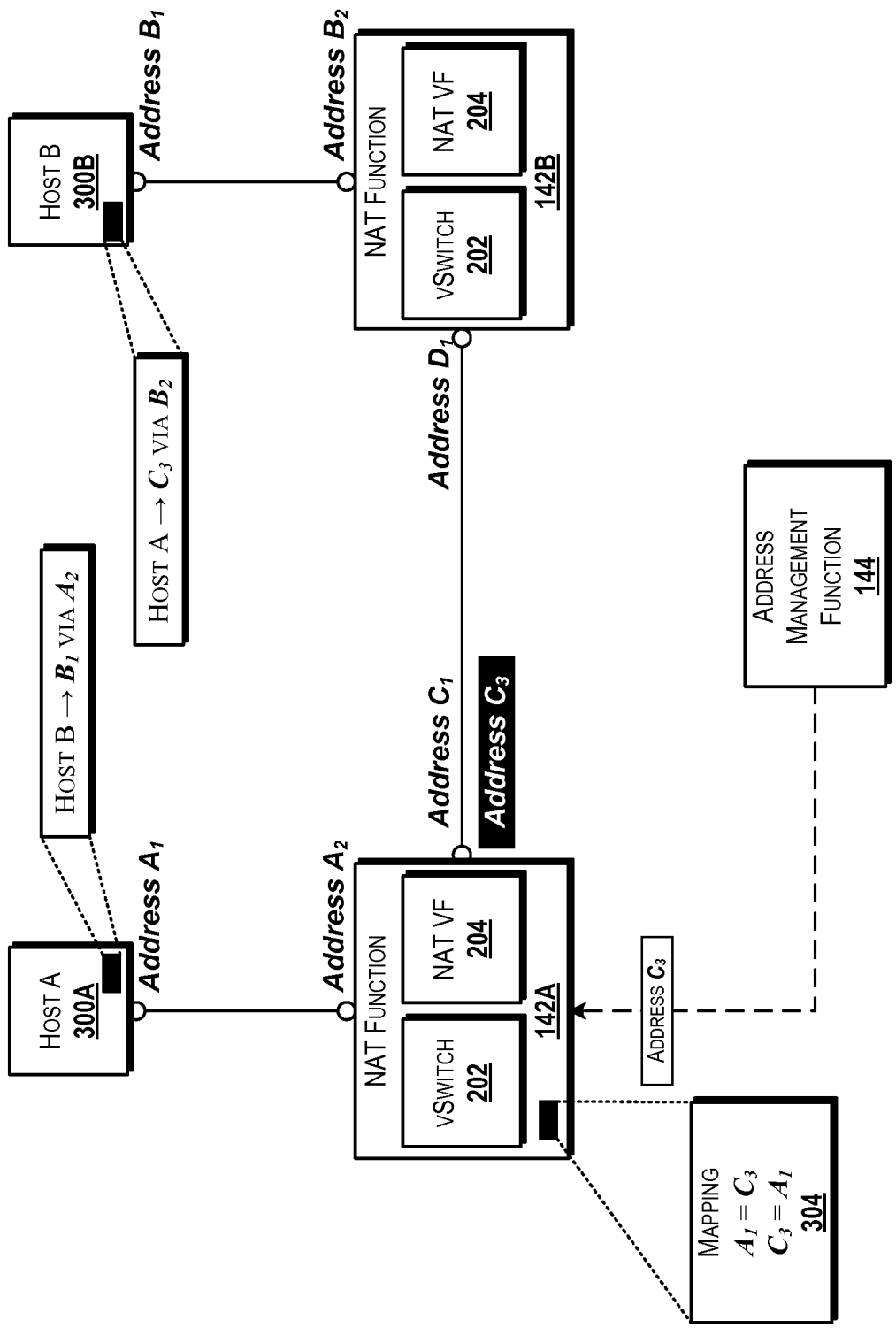

Turning now to FIGS. 3A-3D, additional aspects of a network address translation function 142 are illustrated and described in detail. In particular, FIGS. 3A-3D are system diagrams illustrating three example techniques for providing network address translation, according to some example embodiments of the concepts and technologies described herein. FIG. 3A illustrates a reference embodiment of an operating environment for the network address translation function 142 illustrated and described herein, and each of FIGS. 3B-3C illustrates a technique for providing network address translation to the setup illustrated in the reference embodiment of the operating environment shown in FIG. 3A. Because other operating environments can include network address translation functionality, it should be understood that these examples are illustrative and therefore should not be construed as being limiting in any way.

Referring first to FIG. 3A, an example operating environment is illustrated. As shown in FIG. 3A, two or more hosts can be identified. In the illustrated embodiment, a first host ("Host A") 300A and a second host ("Host B") 300B can be identified. A first forwarding unit 302A, which can function as a forwarding unit for the first host 300A, can be identified. Similarly, a second forwarding unit 302B, which can function as a forwarding unit for the second host 300B, also can be identified. The functionality of the forwarding units 302A, 302B can be provided by one or more routers, switches, application layer routing functions, or the like. It should be understood that these examples are illustrative and therefore should not be construed as being limiting in any way.

Network addresses 208 can be assigned to the hosts 300A, 300B, as well as the forwarding units 302A, 302B. According to various embodiments of the concepts and technologies described herein, the network addresses 208 can be assigned by the address management function 144, though this is not necessarily the case. According to various embodiments, the first host 300A and the first forwarding unit 302A can share an address space A. Thus, the network addresses 208 assigned to the first host 300A and the first forwarding unit 302A can be, respectively, $A_r$ and $A_2$. Additionally, the first forwarding unit 302A can be assigned a network address for external routing. In the illustrated embodiment, the network address for external routing can be an address $C_r$, which can be selected from an address space C. It should be understood that this example is illustrative and therefore should not be construed as being limiting in any way.

Similarly, the second host 300B and the second forwarding unit 302B can share an address space B. Thus, the network addresses 208 assigned to the second host 300B and the second forwarding unit 302B can be, respectively, $B_r$ and $B_2$. Additionally, the second forwarding unit 302B can be assigned a network address for external routing. In the illustrated embodiment, the network address for external routing can be an address Dr, which can be selected from an address space D. It should be understood that this example is illustrative and therefore should not be construed as being limiting in any way.

Connectivity can be established between the two hosts 300A, 300B through various mechanisms. The first host 300A can know about the second host 300B, and the second host 300B can know about the first host 300A. The first host 300A can store a mapping for routing data to the second host 300B. As shown in the example mapping depicted in FIG. 3A, the example mapping stored by and/or accessible to the first host 300A can indicate that the second host 300B is reachable by the address $B_1$ through the local egress point, the address $A_2$. Similarly, the second host 300B can store a mapping for routing data to the first host 300A. The example mapping stored by and/or accessible to the second host 300B can indicate that the first host 300A is reachable by the address $A_1$ through the local egress point, the address $B_2$. It can be appreciated that from the perspective of the hosts 300A, 300B, a direct logical path can exist between the hosts 300A, 300B. It should be understood that this example is illustrative and therefore should not be construed as being limiting in any way.

Figure 3D:
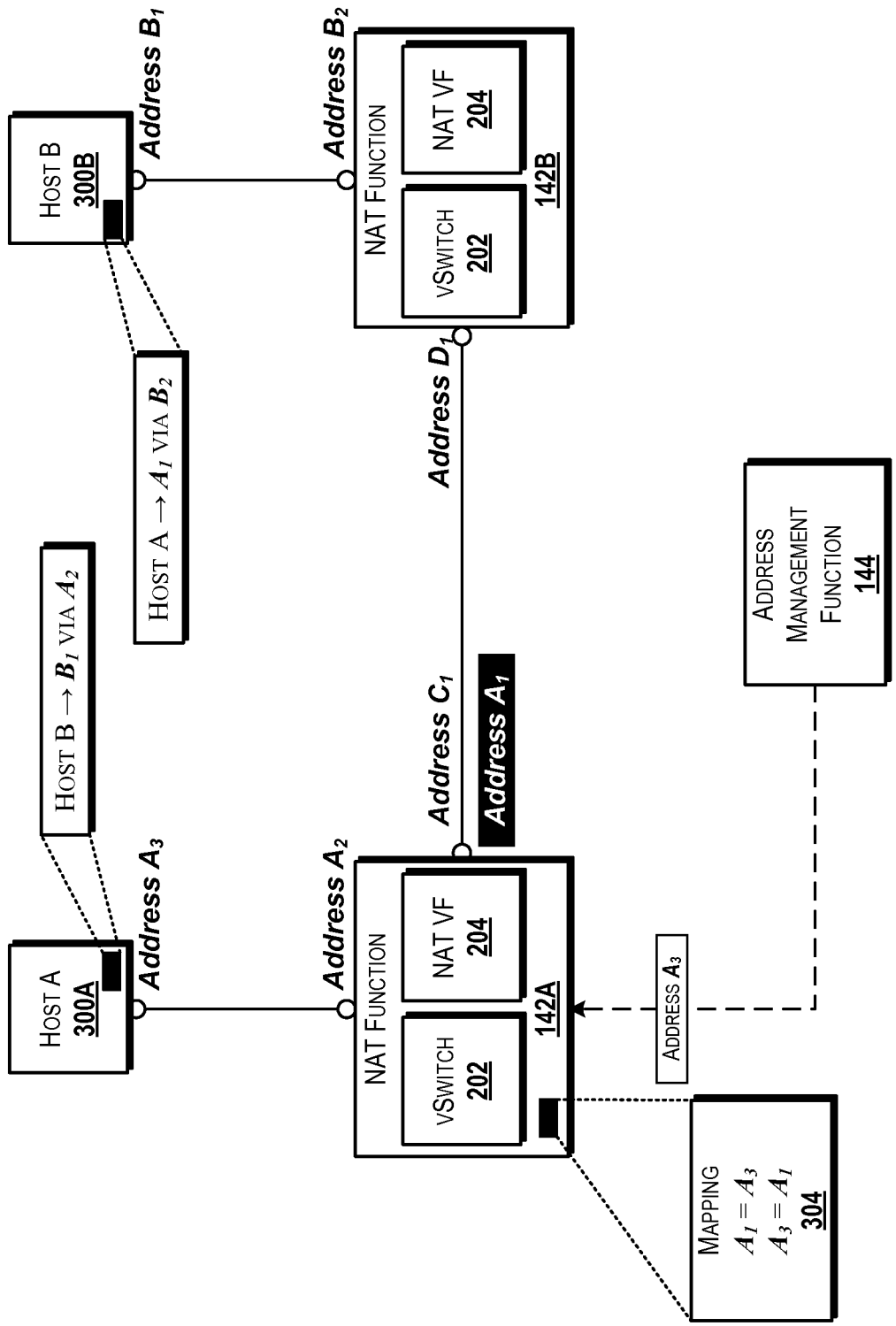

According to various embodiments of the concepts and technologies described herein, the forwarding units 302A, 302B can be replaced by network address translation functions 142 and then connectivity can be reestablished between the hosts 300A, 300B. The replacement of the forwarding units 302A, 302B can be performed in at least three ways, which are illustrated in FIGS. 3B-3D. With reference to FIGS. 3B-3D, it should be understood that the illustrated and described changes to the addresses can be made relative to the operating environment illustrated in FIG. 3A. It should be understood that this example is illustrative and therefore should not be construed as being limiting in any way. It also should be noted that while FIGS. 3A-3D illustrate two hosts 300A, 300B and one path or flow between the hosts 300A, 300B; various embodiments of the concepts and technologies described herein can include and/or rely upon multiple simultaneous and/or distinct flows (e.g., connections) supported by the same and/or different network address translation functions 142. Similarly, more than two hosts 300 can be used in various embodiments of the concepts and technologies described herein, and each flow or connection can have and/or use different network address translation configurations that can be determined statically (e.g., set for a longer duration than the creation of a single flow) or dynamically (e.g., per flow or connection). It should be understood that this example is illustrative and therefore should not be construed as being limiting in any way.

Turning first to FIG. 3B, a first example technique for providing network address translation according to various embodiments of the concepts and technologies described herein will be described in detail. In particular, FIG. 3B shows the use of one or more sub-addresses to provide the network address translation functionality illustrated and described herein. As illustrated in FIG. 3B, the first forwarding unit 302A has been replaced by a first network address translation function 142A, and the second forwarding unit 302B has been replaced by a second network address translation function 142B. A sub-address $C_2$, which can be a sub-address of the address $C_1$, can be used as a translated address for the address $A_1$ associated with the first host 300A.

The first network address translation function 142A can create and maintain a mapping 304 between the address $A_1$ and the sub-address $C_2$ for both directions of travel (from the first host 300A to the second host 300B and from the second host 300B to the first host 300A). The mapping 304 can indicate, inter alia, that the address $A_1$ is translated to the sub-address $C_2$. As can be appreciated with reference to FIG. 3B, the internal address $A_1$ for the first host 300A does not change, nor does the mapping (maintained by the first host 300A) relating to its knowledge of the second host 300B. It can be appreciated, however, that the address for the first host 300A as known by the second host 300B does change, namely from $C_1$ to $C_2$. Thus, the example mapping stored by and/or accessible to the second host 300B can indicate that the first host 300A is reachable by the sub-address $C_2$ through the local egress point, the address $B_2$. It should be understood that this example is illustrative and therefore should not be construed as being limiting in any way.

Turning next to FIG. 3C, a second example technique for providing network address translation according to various embodiments of the concepts and technologies described herein will be described in detail. In particular, FIG. 3C shows the use of one or more new external addresses to provide the network address translation functionality illustrated and described herein. As illustrated in FIG. 3C, the first forwarding unit 302A has been replaced by a first network address translation function 142A, and the second forwarding unit 302B has been replaced by a second network address translation function 142B. A new address $C_3$ can be used as a translated address for the address $A_1$ associated with the first host 300A. The new address $C_3$ can be requested from and provided by the address management function 144. According to various embodiments, the new address $C_3$ can be selected from the address space C, though addresses outside of the address space C can also be used, if desired. The new address $C_3$ can be preassigned to the first network address translation function 142A by the address management function 144, in some embodiments. In some other embodiments, the new address $C_3$ can be provided to the first network address translation function 142A by the address management function 144 upon request from the first network address translation function 142A or the infrastructure control 112 (not visible in FIGS. 3A-3D). It should be understood that this example is illustrative and therefore should not be construed as being limiting in any way.

The first network address translation function 142A can create and maintain a mapping 304 between the address $A_1$ and the new address $C_3$ for both directions of travel (from the first host 300A to the second host 300B and from the second host 300B to the first host 300A). The mapping 304 can indicate, inter alia, that the address $A_1$ is translated to the new address $C_3$. As can be appreciated with reference to FIG. 3C, the internal address $A_1$ for the first host 300A does not change, nor does the mapping (maintained by the first host 300A) relating to its knowledge of the second host 300B. It can be appreciated, however, that the address for the first host 300A as known by the second host 300B does change, namely from $C_1$ to $C_3$. Thus, the example mapping stored by and/or accessible to the second host 300B can indicate that the first host 300A is reachable by the new address $C_3$ through the local egress point, the address $B_2$. It should be understood that this example is illustrative and therefore should not be construed as being limiting in any way.

Turning next to FIG. 3D, a third example technique for providing network address translation according to various embodiments of the concepts and technologies described herein will be described in detail. In particular, FIG. 3D shows the use of one or more transferred host addresses to provide the network address translation functionality illustrated and described herein. As illustrated in FIG. 3D, the first forwarding unit 302A has been replaced by a first network address translation function 142A, and the second forwarding unit 302B has been replaced by a second network address translation function 142B. A transferred host address $A_1$ can be used as a translated address for the address $A_1$ associated with the first host 300A, which can be replaced by a new address $A_3$. It can be appreciated that the new address $A_3$ can be assigned from the address space A.

According to various embodiments, transfer of the host address $A_1$ can be initiated by the first network address translation function 142A (which provides the functionality of a forwarding unit for the first host 300A) and actually effected by the address management function 144. In particular, the first network address translation function 142A can request the new address $A_3$ from, and can be provided the new address $A_3$ by, the address management function 144. The address management function 144 also can re-assign the host address $A_1$ for use by the first network address translation function 142A. According to various embodiments, the new address $A_3$ can be selected from the address space A. The new address $A_3$ therefore can be preassigned to the first network address translation function 142A by the address management function 144, in some embodiments. In some other embodiments, the new address $A_3$ can be assigned to the first network address translation function 142A by the address management function 144 upon request from the first network address translation function 142A or the infrastructure control 112 (not visible in FIGS. 3A-3D), and the information relating to the new address $A_3$ can be provided to the first network address translation function 142A by the address management function 144. The address management function 144 also can re-assign the host address $A_1$ to the first network address translation function 142A. It should be understood that this example is illustrative and therefore should not be construed as being limiting in any way The first network address translation function 142A can create and maintain a mapping 304 between the new address $A_3$ and the transferred address $A_1$ for both directions of travel (from the first host 300A to the second host 300B and from the second host 300B to the first host 300A). The mapping 304 can indicate, inter alia, that the address $A_1$ is translated (e.g., the address management function 144 has re-assigned the address $A_1$ to the first network address translation function 142A) to the new address $A_3$. As can be appreciated with reference to FIG. 3D, the internal address $A_1$ for the first host 300A changes to the new address $A_3$. The mapping (maintained by the first host 300A) relating to its knowledge of the second host 300B, however, does not change. Also, the address for the first host 300A as known by the second host 300B does not change, and as such, the second host 300B can be unaware that the previous address for the first host 300A, namely the address $A_1$, is not the actual address for the first host 300A. It should be understood that this example is illustrative and therefore should not be construed as being limiting in any way.

According to various embodiments of the concepts and technologies described herein, the three techniques illustrated and described herein can provide various advantages. In particular, the first technique illustrated and described herein with reference to FIG. 3B can use a new address for the first host 300A, and the second host 300B can be aware of the change. The second technique illustrated and described herein with reference to FIG. 3C can use a new external address (by way of a pre-assigned or newly created and assigned address), without changing the internal address of the first host 300A. The third technique illustrated and described herein with reference to FIG. 3D can use a new internal address for the first host 300A, but the old address for the first host 300A can be transferred and exposed to the second host 300B, thereby avoiding any knowledge by the second host 300B that the address for the first host 300A has changed. Thus, the third technique can be particularly useful for security reasons and/or load balancing. It should be understood that these examples are illustrative and therefore should not be construed as being limiting in any way.

Figure 4:
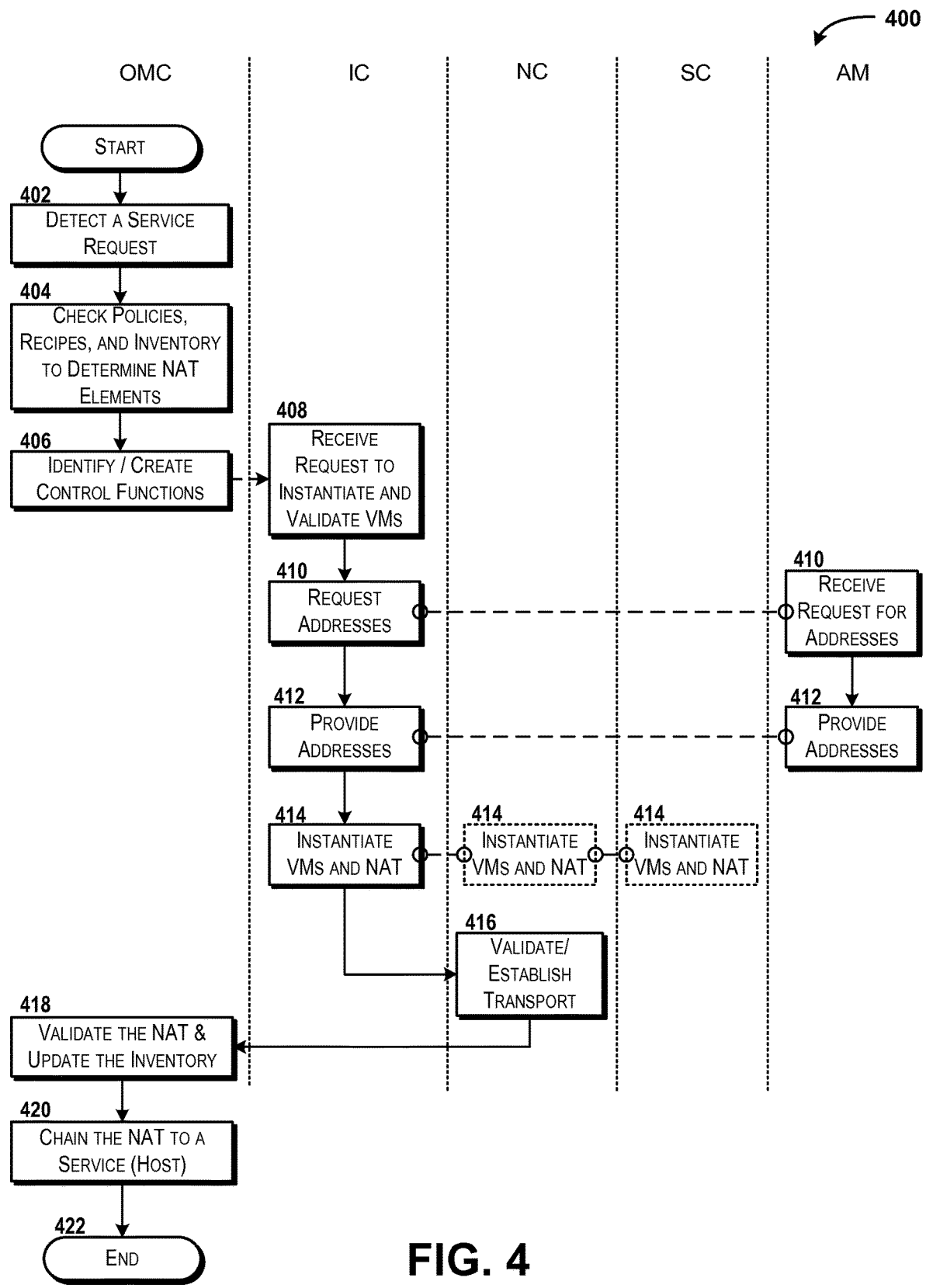
FIG. 4 is a flow diagram showing aspects of a method for instantiating a network address translation function in a software defined networking environment, according to an illustrative embodiment of the concepts and technologies described herein.

Turning now to FIG. 4, aspects of a method 400 for instantiating a network address translation function 142 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the control system 102 or the computer system 200, to perform one or more operations and/or causing the processor to direct other components of the computing system or device to perform one or more of the operations.

For purposes of illustrating and describing the concepts of the present disclosure, the methods disclosed herein are described as being performed by the control system 102 or the computer system 200 via execution of one or more software modules such as, for example, the modules illustrated and described in FIGS. 1-3D including, but not limited to, the operations management controller 106, the infrastructure control 112, the network control 118, the service control 122, and/or the address management function 144. It should be understood that additional and/or alternative devices and/or network nodes can provide the functionality described herein via execution of one or more modules, applications, and/or other software including, but not limited to, the modules shown in FIGS. 1-3D. Furthermore, although the particular modules are mentioned as being capable of providing the disclosed operations, it should be understood that the illustrated embodiments are illustrative, and should not be viewed as being limiting in any way.

The method 400 begins at operation 402. At operation 402, the control system 102 can detect a request for a network address translation function 142 ("network address translation request"). The network address translation request can correspond to an order for a network address translation function 142, a request to create a service 134 that will include functionality associated with a network address translation function 142; a request for a service 134 that will access a network address translation function 142; a request to modify or terminate a service 134 that includes, uses, or accesses a network address translation function 142; a combination thereof; or the like. In some other embodiments, the control system 102 can detect the request in operation 402 by detecting a connection request packet transiting through a switch addressed to an IP address and/or port number. It should be understood that the control system 102 can detect the request in operation 402 or receive the request. In the embodiment shown in FIG. 4, the network address translation request detected in operation 402 can correspond to a request to create a new network address translation function 142 that is external to and/or independent of a service 134. It should be understood that this example is illustrative and therefore should not be construed as being limiting in any way.

In some embodiments, the control system 102 can perform operation 402 by executing the operations management controller 106 and/or functionality associated with the operations management controller 106 as illustrated in FIG. 4. It should be understood that this example is illustrative and therefore should not be construed as being limiting in any way.

From operation 402, the method 400 can proceed to operation 404. At operation 404, the control system 102 can check one or more policies, one or more recipes, and/or one or more inventory to determine network address translation function elements to include in a network address translation function 142 that is responsive to the network address translation request detected in operation 402. Thus, the control system 102 can determine a network address translation switch 202 and a network address translation virtual function 204 that are to provide the functionality of the network address translation function 142 requested by way of the network address translation request. At operation 404, the control system 102 also can check one or more policy rules to determine how a network address translation function 142 should be created and/or various features, requirements, architecture, resources, and/or operational framework associated with such a network address translation function 142.

According to various embodiments of the concepts and technologies described herein, operation 404 can include determining that a network address translation function 142 is to be created as a standalone element. According to some other embodiments, operation 404 can include determining that a network address translation function 142 is to be created as a part of or in proximity to one or more services 134. In some embodiments, the control system 102 can perform operation 404 by executing the operations management controller 106 and/or functionality associated with the operations management controller 106 as illustrated in FIG. 4. It should be understood that this example is illustrative and therefore should not be construed as being limiting in any way.

From operation 404, the method 400 can proceed to operation 406. At operation 406, the control system 102 can identify control functions for the network address translation function 142 being created by way of the method 400. Thus, in operation 406, the control system 102 can identify one or more of an infrastructure control function, a network control function, and/or a service control function for the network address translation function 142 that is requested by way of the network address translation function request received or detected in operation 402. According to various embodiments of the concepts and technologies described herein, the control system 102 can select an appropriate infrastructure control function, network control function, and/or service control function from any number of existing control functions to control the network address translation function 142 and/or the components of the network address translation function 142.

In some other embodiments, the control system 102 may determine that the appropriate service control function does not exist and, in response to making such a determination, can create the service control function that will control the network address translation function 142 and/or its network address translation virtual function 204. Thus, it should be understood that in addition to designating or selecting an infrastructure control function, network control function, and a service control function, operation 406 can include creating and/or allocating a service control function. In some embodiments, the control system 102 can perform operation 406 by executing the operations management controller 106 and/or functionality associated with the operations management controller 106 as illustrated in FIG. 4. It should be understood that this example is illustrative and therefore should not be construed as being limiting in any way.

From operation 406, the method 400 can proceed to operation 408. At operation 408, the control system 102 can receive a request to instantiate and validate one or more virtual machines that will host one or more components of the network address translation function 142. In response to receiving the request to instantiate and validate the virtual machines, the control system 102 can begin a flow to instantiate the virtual machines, load images to the virtual machines and/or trigger instantiation of elements of the network address translation function 142 (e.g., the network address translation switch 202 and/or the network address translation virtual function 204), validation of transport associated with the network address translation function 142, and/or validation of the network address translation function 142 and chaining to one or more services 134.

From operation 408, the method 400 can proceed to operation 410. In operation 410, the control system 102 can request assignment of one or more addresses such as the network addresses 208 illustrated and described herein. Thus, as shown in FIG. 4, operation 410 can include the infrastructure control 112 requesting assignment of the network addresses 208 and/or the address management function 144 receiving the request for assignment of the network addresses 208. It can be appreciated with reference to FIGS. 3A-3D that the addresses requested in operation 410 can correspond to one or more new sub-addresses (e.g., if the technique illustrated and described with reference to FIG. 3B is used); one or more new addresses (e.g., if the technique illustrated and described with reference to FIG. 3C and/or FIG. 3D is used); or the like. Therefore, it can be appreciated that the addresses for which assignment is requested in operation 410 can be assigned from one or more address spaces, that the addresses can be pre-assigned, in some embodiments, and/or that the addresses can be assigned on demand. It should be understood that these examples are illustrative and therefore should not be construed as being limiting in any way.

From operation 410, the method 400 can proceed to operation 412. At operation 412, the control system 102 can assign the addresses requested in operation 410. As such, operation 412 can include the infrastructure control 112 receiving information indicating assignments of the network addresses 208 and/or the address management function 144 assigning the network addresses 208 and/or providing information indicating the assignments of the network addresses 208 for use in the network address translation function 142 and/or for one or more hosts 300 or services 134 to which the network address translation function 142 will be chained. It should be understood that this example is illustrative and therefore should not be construed as being limiting in any way.

From operation 412, the method 400 can proceed to operation 414. In operation 414, the control system 102 can instantiate and validate one or more virtual machines that will host the network address translation virtual function 204 and/or network address translation switch 202 of the network address translation function 142. According to some embodiments, the network address translation virtual function 142 can be created by deploying an image of the network address translation function 142 to one of the virtual machines instantiated and validated in operation 414. As such, operation 414 can include instantiating a virtual machine that can include an embedded image of the network address translation virtual function 204 and/or the network address translation switch 202 if so requested or so instructed by an entity such as the operations management controller 106.

According to various embodiments of the concepts and technologies described herein, the instantiation of the network address translation function 142 can be completed by one or more of the infrastructure control 112, the network control 118, and/or the service control 122, as shown in FIG. 4. In particular, in some embodiments the infrastructure control 112 can instantiate one or more virtual machines and the service control 122 can load one or more images to the virtual machines where the images can include the network address translation virtual function 204. Similarly, the network control 118 can load one or more images including the network address translation switch 202 to one or more of the virtual machines as well. Thus, operation 414 can be performed by the infrastructure control 112, the service control 122, and/or the network control 118 in conjunction with one another, in some embodiments.

In some embodiments, a recipe for a network address translation function 142 can specify where and how the components of the network address translation function 142 will be instantiated. Thus, in some embodiments the recipe can specify that the service control 122 and/or the infrastructure control 112 can load the components of the network address translation function 142 to the virtual machines or other resources allocated by the infrastructure control 112. Thus, it should be understood that the various components of the control system 102 can instantiate the network address translation virtual function 204 in operation 414.

Additionally, in operation 414, the control system 102 can instantiate and configure the network address translation function 142 and/or one or more network address translation switches 202 or network address translation virtual functions 204 thereof. Also, in some embodiments of the concepts and technologies described herein, operation 414 can include the address management function 144 providing the network addresses of the hosts 300 (e.g., the first host 300A) and/or services 134 to the network address translation function 142 as part of a default configuration. As used herein with reference to operation 414, "configuring" the network address translation function 142 and/or components thereof can refer to activating the network address translation function 142 and/or establishing a base or default configuration for the network address translation function 142. Thus, operation 414 can include specifying what application programming interfaces the network address translation function 142 will use, expose, or access, or the like.

According to various embodiments, events can be reported to a DCAE process and/or inventory can be updated for each scope. Thus, for example, the infrastructure control 112 can update an infrastructure DCAE process and an infrastructure inventory, and the network control 118 can update a network DCAE process and a network inventory when the network address translation switch 202 is instantiated and/or allocated. It can be appreciated that the infrastructure control 112 can be aware of underlying resources (e.g., compute resources, virtual machines, hypervisor, etc.) used to instantiate the network components and the network control 118 can be aware of the network components (e.g., the network address translation switch 202) that have been instantiated. Similarly, the infrastructure control 112 can update an infrastructure DCAE process and an infrastructure inventory, and the service control 122 can update a service DCAE process and a service inventory when the network address translation virtual function 204 is instantiated and/or allocated. It can be appreciated that the infrastructure control 112 can be aware of underlying resources (e.g., compute resources, virtual machines, hypervisor, etc.) used to instantiate the service or application components and the service control 122 can be aware of the service or application components (e.g., the network address translation virtual function 204) that have been instantiated.

The updating of inventories and/or reporting to DCAE processes can occur as part of operation 414 and/or as separate operation(s). Although not shown in FIG. 4, it should be understood that the operations management controller 106 module of the control system 102 can instruct the infrastructure control 112, or a component thereof, to instantiate one or more virtual machines. Thus, in some embodiments of the concepts and technologies described herein, where the components of the control system 102 can be distributed across multiple devices, it should be understood that communications between the components can occur to trigger one or more of the operations illustrated and described herein. It should be understood that this example is illustrative and therefore should not be construed as being limiting in any way. As noted above, operation 414 also can include the control system 102 establishing the network address translation switch 202 associated with the network address translation function 142. The control system 102 also can update the inventory 110 and/or one or more local inventories to reflect creation of the network address translation switch 202.

From operation 414, the method 400 can proceed to operation 416. At operation 416, the control system 102 can validate and/or establish transport. Operation 416 can include the network control 118 creating transport or ensuring that transport exists between the network control 118 and the virtual machine that is to host the network address translation switch 202 (or alternatively between the network control 118 and the network address translation switch 202 if already instantiated by the infrastructure control 112), as well as creating transport or ensuring that transport exists between the service control 122 and the virtual machine that is to host the network address translation virtual function 204 (or alternatively between the service control 122 and the network address translation virtual function 204 if already instantiated by the infrastructure control 112). It should be understood that this example is illustrative and therefore should not be construed as being limiting in any way.

In operation 416, the control system 102 also can establish transport between the network address translation function 142 and the service control 122; the transport between components of the network address translation function 142; the transport between the network address translation function 142 and services 134; combinations thereof, or the like. In some embodiments, the control system 102 can perform operation 416 by executing the network control 118 and/or functionality associated with the network control 118 as illustrated in FIG. 4. It should be understood that this example is illustrative and therefore should not be construed as being limiting in any way. From operation 416, the method 400 can proceed to operation 418. At operation 418, the control system 102 can validate the network address translation function 142 end-to-end and update the inventory 110. In some embodiments, each of the scope domains can validate the network address translation function 142 or portions thereof associated with that scope domain instead of the control system 102 providing end-to-end validation. In some embodiments in which the operations management controller 106 validates the network address translation function 142 end-to-end, the control system 102 can perform operation 418 by executing the operations management controller 106 and/or functionality associated with the operations management controller 106 as illustrated in FIG. 4. In some embodiments in which each of the scope domains validates a portion of the network address translation function 142, the control system 102 can perform operation 418 by executing the operations management controller 106, the infrastructure control 112, the network control 118, and/or the service control 122 and/or functionality associated with these modules. It should be understood that this example is illustrative and therefore should not be construed as being limiting in any way.

It can be appreciated that by this point in the flow of the method 400, the control system 102 can have created and instantiated a standalone network address translation function 142. As mentioned above, according to various embodiments the control system 102 can chain the network address translation function 142 to one or more services 134 and/or a host such as the first host 300A and/or the second host 300B illustrated and described herein with reference to FIGS. 3A-3D. Thus, it should be understood that the next operation described herein can be omitted, as with other operations of this method 400.

From operation 418, the method 400 can proceed to operation 420. At operation 420, the control system 102 can chain the network address translation function 142 to one or more services 134 (e.g., one or more hosts such as the hosts 300A, 300B illustrated and described above with reference to FIGS. 3A-3D). Traffic associated with the one or more services 134 (e.g., traffic originating at, flowing from, flowing to, and/or received by the hosts 300A, 300B) can flow through the network address translation function 142 and/or addresses associated with the traffic can be translated, according to various embodiments. Because the use of network address translation with respect to traffic is generally understood, the operation of the network address translation function 142 will not be further described herein in detail.

From operation 420, the method 400 can proceed to operation 422. The method 400 can end at operation 422.

Figure 5:
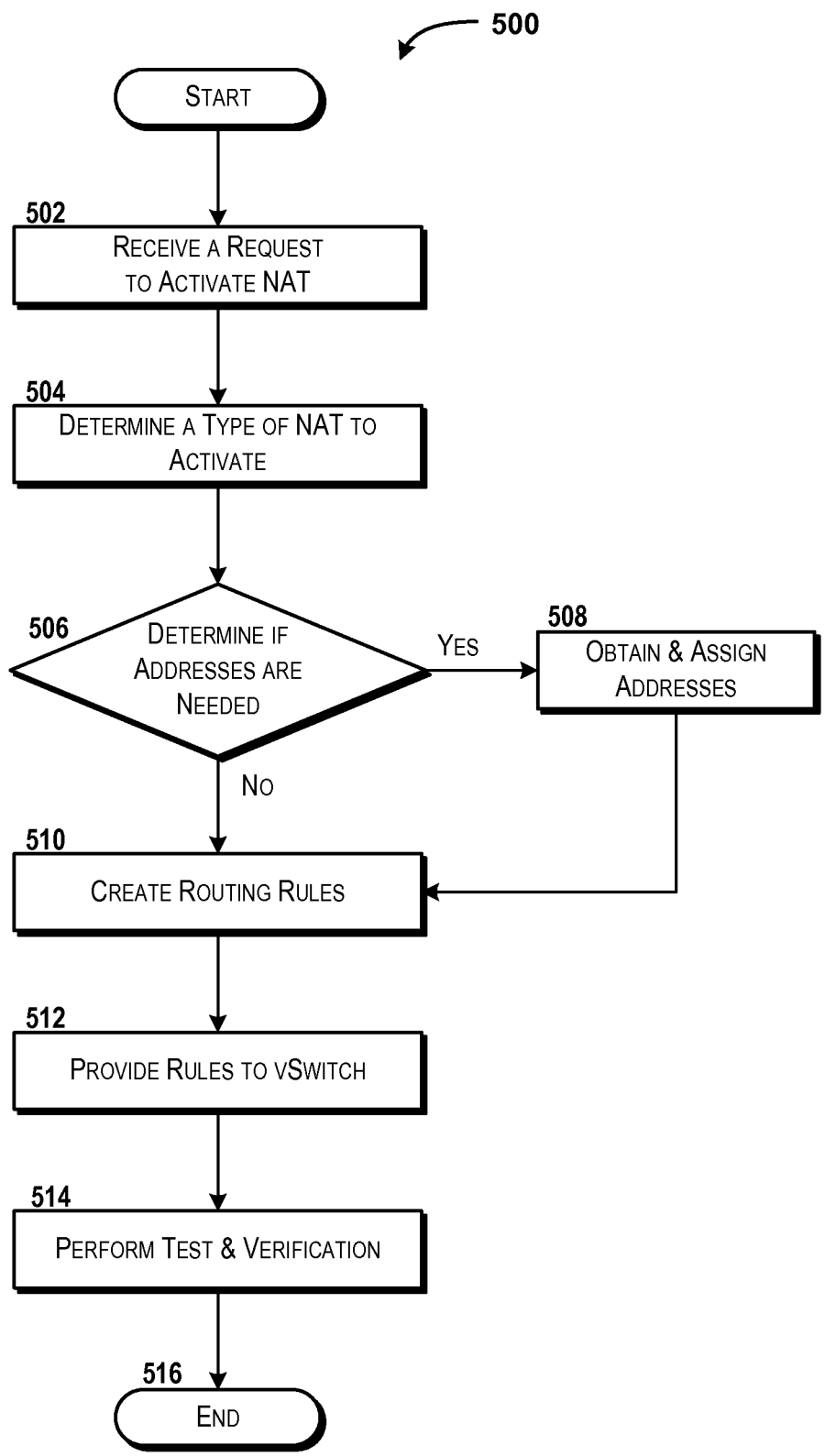
FIG. 5 is a flow diagram showing aspects of a method for activating or modifying a network address translation function in a software defined networking environment, according to an illustrative embodiment of the concepts and technologies described herein.

Turning now to FIG. 5, aspects of a method 500 for a network address translation function 142 will be described in detail, according to an illustrative embodiment. The method 500 begins at operation 502. At operation 502, the computer system 200 can receive a request to activate a network address translation function 142. In some embodiments, the computer system 200 can instead receive a request to modify an already activated network address translation function 142 in operation 502. Thus, it can be appreciated that a method to activate a network address translation function 142 and a method to modify the network address translation function 142 can be substantially similar to the method 500 illustrated and described herein with reference to FIG. 5. For purposes of brevity and clarity, however, the method 500 is illustrated and described with reference to an embodiment for activating the network address translation function 142. It should be appreciated that the request received in operation 502 can be received from services, from network operators, from customers, and/or from other entities.

From operation 502, the method 500 can proceed to operation 504. At operation 504, the computer system 200 can determine a type of network address translation that will be activated. Thus, the computer system 200 can determine, in some embodiments of operation 504, if the network address translation function 142 will translate an address associated with a host to an externally routable sub-address. In some other embodiments of operation 504, the computer system 200 can determine if the network address translation function 142 will translate an address associated with the host to an externally routable address. In yet other embodiments, the computer system 200 can determine in operation 504 if the network address translation function 142 will transfer the address associated with the host to the network address translation switch 202. As such, operation 504 can correspond to the computer system 200 determining what technique of network address translation to use for the network address translation function 142.

From operation 504, the method 500 can proceed to operation 506. At operation 506, the computer system 200 can determine if network addresses 208 are needed to implement the network address translation functionality determined to be requested in operation 504. If the computer system 200 determines, in operation 506, that network addresses 208 are needed, the method 500 can proceed to operation 508. In operation 508, the computer system 200 can request assignment of and/or binding of the network addresses 208 from the infrastructure control 112. Thus, operation 508 can include assignment of network addresses 208 to the network address translation function 142 and (in the case of an address transfer) providing, to the network address translation function 142, any new network addresses 208 assigned to the hosts 300 (e.g., the host 300A). Although not separately shown in FIG. 5, it can be appreciated from the above description of FIGS. 1-4 that the infrastructure control 112 can request the network addresses 208 from the address management function 144. The request for the network addresses 208 can request new or additional addresses for one or more of the network address translation switch 202 and/or the host 300 (e.g., the first host 300A). It should be understood that this example is illustrative and therefore should not be construed as being limiting in any way.

The address management function 144 can create and/or assign the network addresses 208 per instructions and/or as requested by the infrastructure control 112. The infrastructure control 112 can bind the new addresses to the network address translation switch 202, if the technique for network address translation is determined to be one of the techniques illustrated and described above with reference to FIGS. 3B-3C. If the technique for network address translation is determined in operation 504 to be the technique illustrated and described above with reference to FIG. 3D, the network addresses 208 can be bound to the host instead of the network address translation switch 202. It should be understood that this example is illustrative and therefore should not be construed as being limiting in any way.

From operation 508, the method 500 can proceed to operation 510. The method 500 also can proceed to operation 510 if the computer system 200 determines, in operation 508, that the network addresses 208 are not needed. In operation 510, the computer system 200 can create rules for routing traffic ("routing rules"). The rules can, in some embodiments, be represented by a match-action table or other data structure, and can include mappings, network translations, and/or other rules for routing traffic from one host to another and/or to various entities through or via the network address translation function 142.

From operation 510, the method 500 can proceed to operation 512. At operation 512, the computer system 200 can provide the rules generated in operation 510 to the network address translation switch 202. Thus, operation 512 can include providing the routing rules and/or instructions to the network address translation switch 202 so the network address translation function 142 can commence translating addresses and/or routing traffic.

From operation 512, the method 500 can proceed to operation 514. At operation 514, the computer system 200 can (e.g., via a service control function that controls the network address translation function 142) perform test and verification of the network address translation function 142. In some embodiments of the operation 514, the computer system 200 can invoke an external test and/or verification service to verify the network address translation function 142. In some other embodiments, the service control function that controls the network address translation function 142 can request the network control 118 to route traffic through the network address translation function 142 so that operation of the network address translation function 142 can be tested and/or verified. It should be understood that these examples are illustrative and therefore should not be construed as being limiting in any way. The network address translation virtual function 204 can be notified that the network address translation function 142 is active, in various embodiments, and as such, it can be appreciated that the method 500 can result in an activated network address translation function 142. It should be understood that this example is illustrative and therefore should not be construed as being limiting in any way.

From operation 514, the method 500 can proceed to operation 516. The method 500 can end at operation 516.

Example of Operation of a Network Address Translation Function

An example flow of operation of the network address translation function 142 will now be described, according to an example embodiment. A host (e.g., the first host 300A) can prepare a packet for transmission to another host such as the second host 300B. The packet can indicate a destination address for the second host 300B to enable the packet to reach the second host 300B. The packet also can indicate a source address for the first host 300A, as generally is understood.

The packet can arrive at the network address translation switch 202, which can serve as a local egress point for one or more virtual functions of the first host 300A. The network address translation switch 202 can review the routing rules and determine, based upon the routing rules, that the source address (e.g., the address of the first host 300A or other component of a service 134) should be changed to a different or translated address. The network address translation switch 202 can translate the source address (e.g., using one of the three techniques illustrated and described herein with reference to FIG. 3A-3D or other techniques) and forward the packet toward the second host 300B.

The packet can arrive at the second host 300B via a forwarding unit 302B and/or via a second network address translation function 142B. As noted above, the packet now can indicate a source address as translated by the network address translation switch 202 (instead of the actual address of the first host 300A). The second host 300B can prepare a response to the first host 300A. When sending the response, the second host 300B can use the translated source address from the received packet as the destination address for the response packet(s). The packet can arrive at the second forwarding unit 302B or second network address translation function 142B, which can serve as the local egress point for the second host 300B. The second forwarding unit 302B and/or a network address translation switch 202 of the second network address translation function 142B can route the packet to the first network address translation function 142A.

The packet can arrive at the network address translation switch 202 of the first network address translation function 142A. The first network address translation function 142A can review its mappings and/or routing rules to determine what to do with the packet. The routing rules can indicate that the network address translation switch 202 of the first network address translation function 142A should replace the destination address of the packet with the actual address of the first host 300A (or a virtual function thereof). The network address translation switch 202 of the first network address translation function 142A can forward the packet to the first host 300A, and the packet can arrive at a virtual function of the first host 300A. It can be appreciated that this described flow can be independent of an address management scheme or technique as illustrated and described herein.

Example of Scaling a Network Address Translation Function

An example flow for scaling a network address translation function 142 will now be described. It should be understood that the described scaling is illustrative of the concepts and technologies described herein. Scaling as disclosed herein can include horizontal scaling, for example, providing additional infrastructure (e.g., additional virtual machines, compute resources, memory resources, disk storage resources, or the like) for existing network address translation virtual functions 204 and/or network address translation switches 202; vertical scaling (e.g., adding additional network resources such as additional transport, additional switches, additional virtual functions such as, for example, adding other network address translation virtual functions 204, or the like); and/or other types of scaling. Thus, the described scaling should be understood as being illustrative and should not be construed as being limiting in any way.

The service control function that controls the network address translation function 142 can detect a scaling event (e.g., a request to scale the network address translation function 142, or the like). In response to detecting the request, the service control function can initiate a responsive action. According to various embodiments, the infrastructure control 112 can allocate resources. In particular, the infrastructure control 112 can receive instructions from the service control function that controls the network address translation function 142 to instantiate one or more virtual machines. The infrastructure control 112 can load and validate images with an embedded network address translation virtual function 204 and/or network address translation switch 202 if instructed to do so. The infrastructure control 112 can report the event to an infrastructure level DCAE process and update its infrastructure inventory. The infrastructure control 112 also can instantiate virtual machines and, if instructed, the network address translation virtual function 204 and/or network address translation switch 202 within the infrastructure 114.

Existing transport can be validated and/or new transport can be created between the virtual machines and/or the network address translation virtual function 204 and the service control function that controls the network address translation function 142. In particular, the network control 118 can receive instructions from the infrastructure control 112 to establish transport between the network address translation virtual function 204 and the service control function that controls the network address translation function 142. This may be done through the network address translation switch 202. The network control 118 can report the event to a network scope DCAE process and update its network inventory. The appropriate network virtual functions and/or infrastructure networking functions can be updated.

The network address translation virtual function 204 can be instantiated by the service control function that controls the network address translation function 142, if not already instantiated by the infrastructure control 112 and/or configured by the service control function that controls the network address translation function 142. The service control function that controls the network address translation function 142 can instantiate and configure the network address translation virtual function 204. The service control function can report the event to a service (or application) scope DCAE process and update its service (or application) inventory. The service control function also can instantiate and configure the network address translation virtual function 204.

Existing transport can be validated and/or new transport can be created between the network address translation switch 202 and the services 134 the network address translation function 142 will be chained to. In one contemplated example, the services 134 the network address translation function 142 can be chained to the first host 300A via the network address translation switch 202. It should be understood that this example is illustrative and therefore should not be construed as being limiting in any way. The network address translation virtual function 204 may also be chained to the first host 300A if user traffic is to flow through the first host 300A.

The network control 118 can receive instructions from the service control function that controls the network address translation function 142 to establish transport between the first host 300A and the network address translation switch 202. The network control 118 may receive further instructions to establish transport between the first host 300A and the network address translation virtual function 204. The network control 118 can report the event to a network scope DCAE process and updates its network inventory. The network control 118 can establish the transport using network virtual functions (e.g., switches) and/or infrastructure networking functions.

The service control function that controls the network address translation function 142 can perform end to end validation of the new service. It should be noted that each of the scope domains (e.g., infrastructure scope, network scope, and/or service (or application) scope) may perform their own validation within their scope. The service control function that controls the network address translation function 142 can update the inventory (other scopes may update respective inventories as well). It should be appreciated that the above-described flow describes the scaling of the network address translation virtual function 204 and/or network address translation switch 202 as detected and initiated by the service control function that controls the network address translation function 142. The network control 118 can also detect and initiate scaling for the network address translation switch 202 using a similar process.

Figure 6:
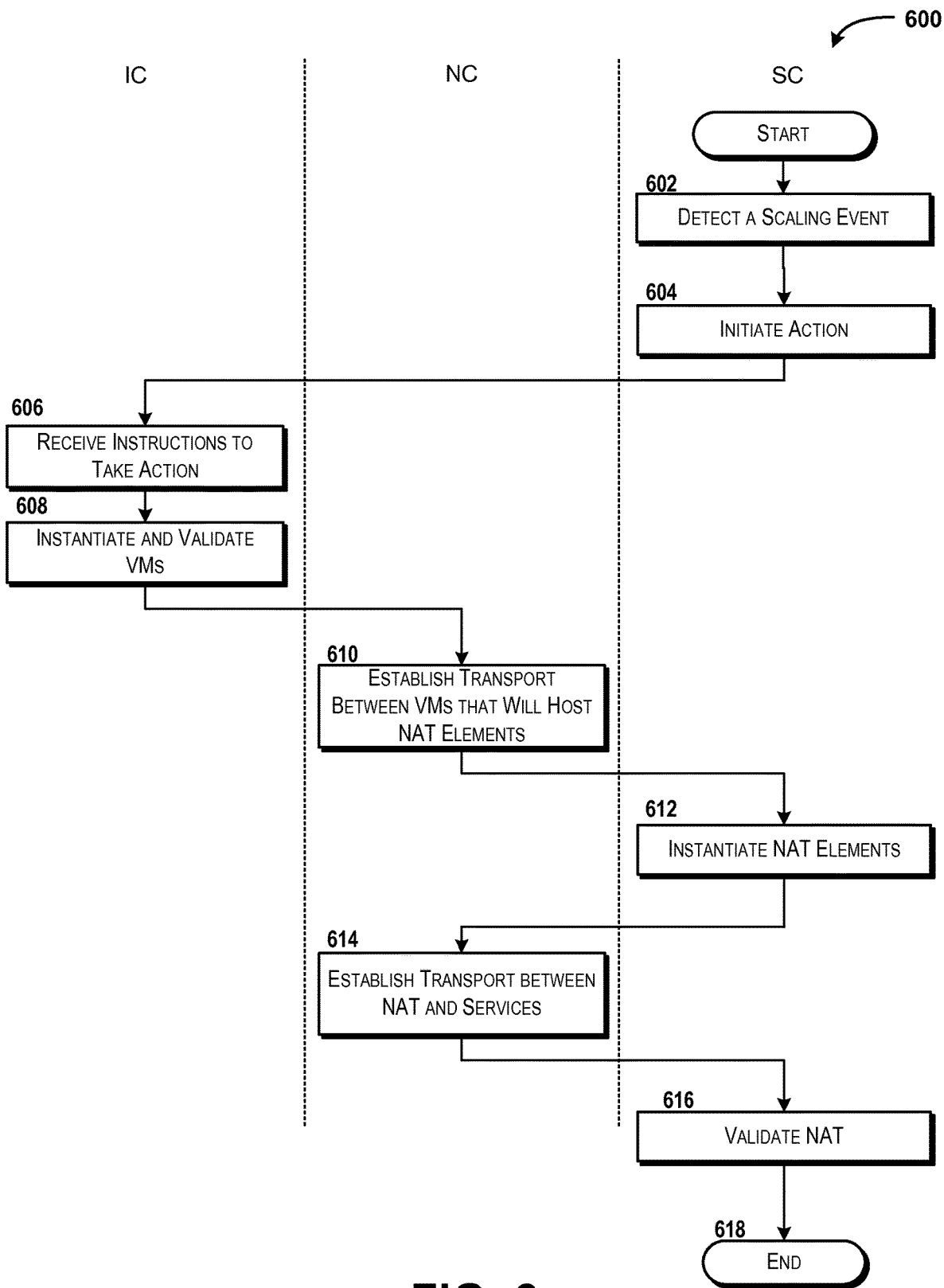
FIG. 6 is a flow diagram showing aspects of a method for scaling or modifying a network address translation function in a software defined networking environment, according to an illustrative embodiment of the concepts and technologies described herein.

Thus, a method 600 for scaling a network address translation function 142 is illustrated with reference to FIG. 6. Although particular modules of the control system 102 and/or the computer system 200 are referenced herein with respect to particular operations of the method 600, it should be understood that the control system 102 and/or the computer system 200 can execute one or more of the operations illustrated and described herein with reference to the method 600. As such, it should be understood that the illustrated and described example is illustrative and therefore should not be construed as being limiting in any way.

At operation 602, the service control function that controls the network address translation function 142 can detect a scaling event. In response to detecting the event, as shown at operation 604, the service control function that controls the network address translation function 142 can initiate a responsive action. As shown in FIG. 6, the infrastructure control 112 can receive an indication that action should be taken (e.g., via a message from the service control function). In particular, as shown at operation 606, the infrastructure control 112 can receive instructions from the service control function that controls the network address translation function 142 to instantiate one or more virtual machines.

As shown at operation 608, the infrastructure control 112 can load and validate images with an embedded network address translation virtual function 204 and/or network address translation switch 202 if instructed to do so. The infrastructure control 112 can report the event to an infrastructure level DCAE process and update its infrastructure inventory. The infrastructure control 112 also can instantiate virtual machines and/or allocate compute resources, memory resources, disk storage resources, or the like, and, if instructed, the network address translation virtual function 204 and/or network address translation switch 202 within the infrastructure 114. Existing transport can be validated and/or new transport can be created between the virtual machines and/or the network address translation virtual function 204 and the service control function that controls the network address translation function 142.

At operation 610, the network control 118 can receive instructions from the infrastructure control 112 to establish transport between the network address translation virtual function 204 and the service control function that controls the network address translation function 142. The network control 118 can report the event to a network scope DCAE process and update its network inventory. The appropriate network virtual functions and/or infrastructure networking functions can be updated.

At operation 612, the network address translation virtual function 204 can be instantiated by the service control function that controls the network address translation function 142, if not already instantiated by the infrastructure control 112 and/or configured by the service control function that controls the network address translation function 142. As explained above, the service control function that controls the network address translation function 142 can instantiate and configure the network address translation virtual function 204. The service control function can report the event to a service (or application) scope DCAE process and update its service (or application) inventory. The service control function also can instantiate and configure the network address translation virtual function 204.

At operation 614, existing transport can be validated and/or new transport can be created between the network address translation switch 202 and the one or more services 134 to which the network address translation function 142 will be chained. The network control 118 can report the event to a network scope DCAE process and updates its network inventory. The network control 118 can establish the transport using network virtual functions (e.g., switches) and/or infrastructure networking functions.

At operation 616, the service control function that controls the network address translation function 142 can perform end to end validation of the network address translation function 142 and/or the new service 134 that includes the network address translation functionality. The service control function that controls the network address translation function 142 can update the inventory. From operation 616, the method 600 can proceed to operation 618. The method 600 can end at operation 618.

Example of Modifying a Network Address Translation Function

An event that triggers a message to a network control 118 can be detected. The detection can occur in at least two manners. In a first example, the network address translation virtual function 204 can detect an event and initiate responsive action, which can include a message to the network control 118. In another example, a virtual function of a host (e.g., the first host 300A) can detect an event and report the event to a service control function associated with a service 134 that includes the first host 300A. The service control function can analyze the message (report) and send a message to the network control 118 to prompt a responsive action. It should be understood that these examples are illustrative and therefore should not be construed as being limiting in any way.

The network control 118 can receive a request from either the service control function or the network address translation virtual function 204 to modify existing network address translation functionality. The requested modification can include changing the behavior of the network address translation function 142 or deactivating the network address translation function 142. It should be noted that the request from the network address translation virtual function 204 to the network control 118 may go through the service control function that controls the network address translation function 142 or go directly from the network address translation virtual function 204 to the network control 118.

If the network control 118 determines that additional network addresses 208 are required to implement the modified network address translation functionality, the network control 118 can request assignment and binding of the network addresses 208 from the infrastructure control 112. The infrastructure control 112 can request assignment of one or more of the network addresses 208 from the address management function 144. The request may include a request for assignment of new or additional network addresses 208 for the network address translation switch 202 and/or a host such as the first host 300A. The address management function 144 can assign the network addresses 208 as requested by the infrastructure control 112. Additional or new address(es) 208 can be bound to the network address translation switch 202. New network address(es) also can be bound to a host such as the first host 300A if the address transfer technique illustrated and described above with reference to FIG. 3D is used. It should be noted that network addresses 208 assigned by the address management function 144 may be bound to the network address translation switch 202 and/or a host such as the first host 300A by the infrastructure control 112.

The network control 118 can modify one or more routing rules for the routing of traffic. These routing rules may exist in the form of match-action tables or other data structures, as explained above. The modified routing rules can be transmitted to the network address translation switch 202. The service control function that controls the network address translation function 142 can be notified of the modification and may perform test and verification. In various embodiments, the service control function may invoke an external test and verification service, while in some other embodiments the service control function can request the network control 118 to route traffic through the network address translation virtual function 204 for verification. The network address translation virtual function 204 may be updated regarding the modification, and the network address translation function 142 has now been modified. It should be understood that this example is illustrative and therefore should not be construed as being limiting in any way.

Figure 7:
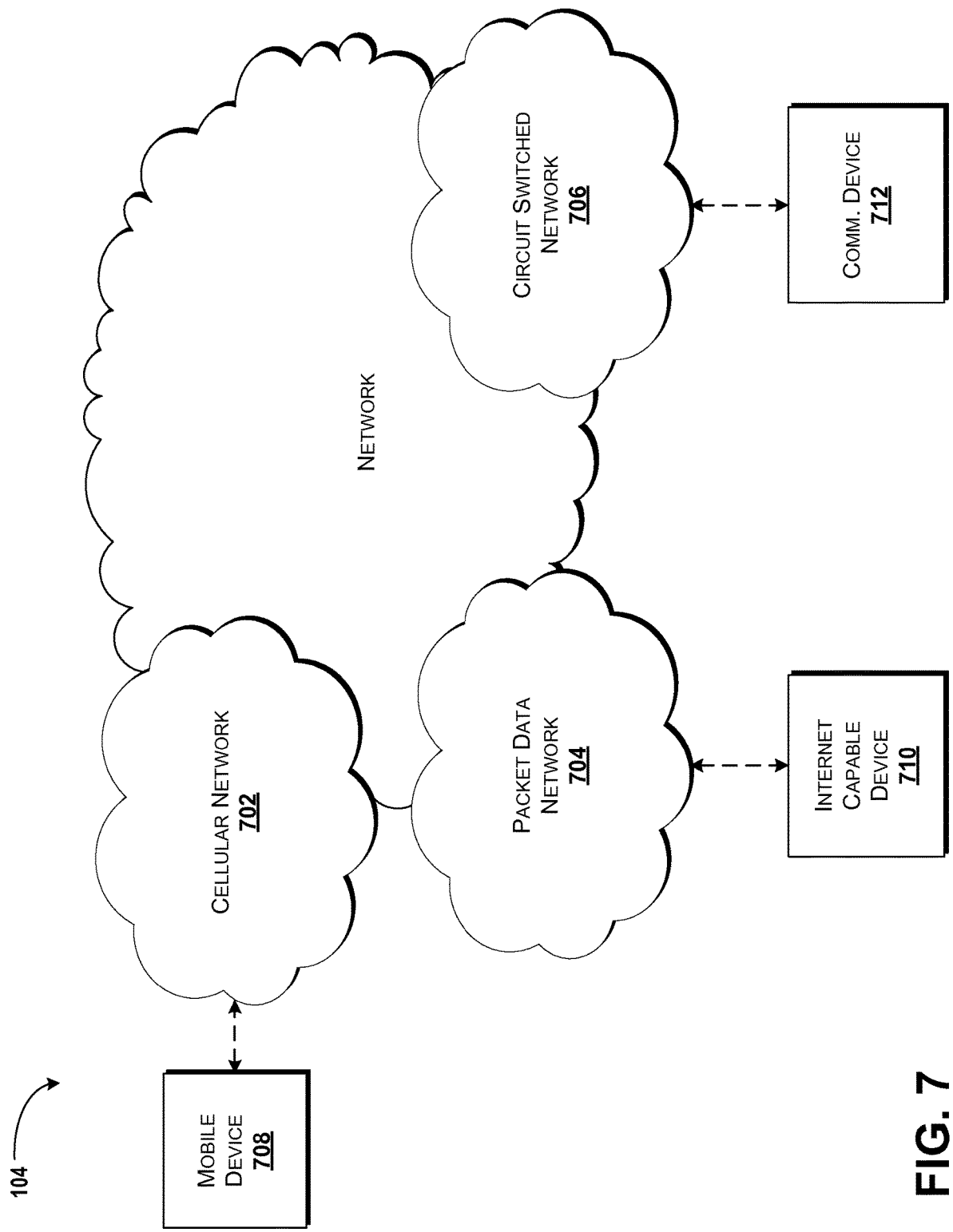
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards as well as evolved and future mobile standards.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

Figure 8:
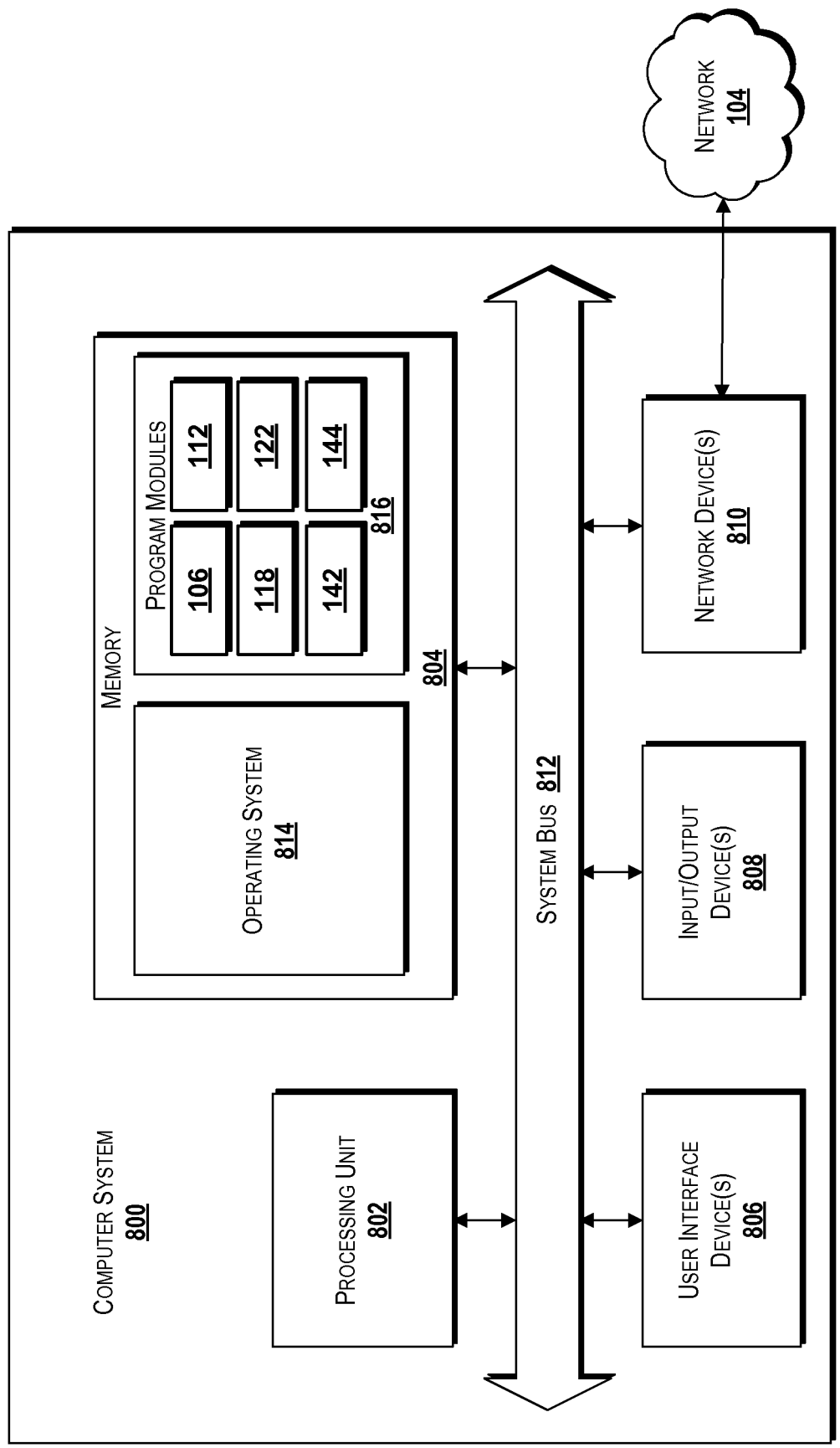
FIG. 8 is a block diagram illustrating an example computer system configured to create, provide, host, and/or interact with a network address translation function, according to some illustrative embodiments of the concepts and technologies described herein.

FIG. 8 is a block diagram illustrating a computer system 800 configured to provide the functionality described herein for creating and/or using network address translation functions 142, in accordance with various embodiments of the concepts and technologies disclosed herein. The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 include the operations management controller 106, the infrastructure control 112, the network control 118, the service control 122, the network address translation function 142, the address management function 144, and/or other modules illustrated and described herein. These and/or other programs can be embodied in computer-readable media containing instructions that, when executed by the processing unit 802, perform one or more of the methods 400, 500, 600 described in detail above with respect to FIGS. 4-6. According to some embodiments, the program modules 816 may be embodied in hardware, software, firmware, or any combination thereof. Although not shown in FIG. 8, it should be understood that the memory 804 also can be configured to store the policies, the service creation database 108, the inventory 110, the network address translation configuration data 206, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing network address translation in a software defined networking environment have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A control system comprising:
   a processor; and
   a memory that stores computer-executable instructions that, when executed by the processor, cause the processor to perform operations comprising
      identifying a network address translation switch and a network address translation virtual function that are to provide functionality of a network address translation function,
      triggering a network control function to instantiate the network address translation switch on a virtual machine,
      triggering a service control function to instantiate the network address translation virtual function on the virtual machine,
      chaining, via the network address translation switch, the network address translation function to a host, whereby traffic from the host flows to the network address translation function, wherein the network address translation function provides address translation for the host using the network address translation switch, wherein the network address translation switch is controlled by the network control function, and wherein the network address translation virtual function is controlled by the service control function, and
      assigning a sub-address to the network address translation function, wherein the sub-address is used as an external address for the network address translation function and is assigned from an address space associated with a previous external address of the network address translation function.

2. The control system of claim 1, wherein the computer-executable instructions, when executed by the processor, cause the processor to perform operations further comprising:
   receiving, via an application programming interface, network address translation configuration data at the network address translation function.

3. The control system of claim 2, wherein the network address translation switch is configured by the network address translation configuration data, and wherein the network address translation configuration data specifies one network address translation technique of a plurality of network address translation techniques to be applied by the network address translation function.

4. The control system of claim 1, wherein the network address translation function comprises the network address translation virtual function and the network address translation switch.

5. The control system of claim 4, wherein the network address translation switch operates on a transport layer of a network.

6. The control system of claim 4, wherein the network address translation virtual function operates on an application layer of a network.

7. A method comprising:
   identifying, at a control system comprising a processor, a network address translation switch and a network address translation virtual function that are to provide functionality of a network address translation function;
   triggering, by the processor, a network control function to instantiate the network address translation switch on a virtual machine;
   triggering, by the processor, a service control function to instantiate the network address translation virtual function on the virtual machine;
   chaining, by the processor and via the network address translation switch, the network address translation function to a host, whereby traffic from the host flows to the network address translation function, wherein the network address translation function provides address translation for the host using the network address translation switch, wherein the network address translation switch is controlled by the network control function, and wherein the network address translation virtual function is controlled by the service control function; and
   assigning, by the processor, a sub-address to the network address translation function, wherein the sub-address is used as an external address for the network address translation function and is assigned from an address space associated with a previous external address of the network address translation function.

8. The method of claim 7, further comprising:
   receiving, via an application programming interface exposed by the network address translation virtual function, network address translation configuration data.

9. The method of claim 7, wherein the network address translation function comprises the network address translation virtual function and the network address translation switch.

10. The method of claim 9, wherein the network address translation switch operates on a transport layer of a network.

11. The method of claim 8, wherein the network address translation switch is configured by the network address translation configuration data, and wherein the network address translation configuration data specifies one network address translation technique of a plurality of network address translation techniques to be applied by the network address translation function.

12. The method of claim 9, wherein the network address translation virtual function operates on an application layer of a network.

13. A computer storage medium having computer-executable instructions stored thereon that, when executed by a processor, cause the processor to perform operations comprising:
- identifying a network address translation switch and a network address translation virtual function that are to provide functionality of a network address translation function;
- triggering a network control function to instantiate the network address translation switch on a virtual machine, wherein the network control function is in communication with a control system;
- triggering a service control function to instantiate the network address translation virtual function on the virtual machine, wherein the service control function is in communication with the control system;
- chaining, via the network address translation switch, the network address translation function to a host, whereby traffic from the host flows to the network address translation function, wherein the network address translation function provides address translation for the host using the network address translation switch, wherein the network address translation switch is controlled by the network control function, and wherein the network address translation virtual function is controllable by the service control function; and
- assigning a sub-address to the network address translation function, wherein the sub-address is used as an external address for the network address translation function and is assigned from an address space associated with a previous external address of the network address translation function.

14. The computer storage medium of claim 13, wherein the computer-executable instructions, when executed by the processor, cause the processor to perform operations further comprising:
- receiving, via an application programming interface, network address translation configuration data at the network address translation function.

15. The computer storage medium of claim 13, wherein the computer-executable instructions, when executed by the processor, cause the processor to perform operations further comprising:
- receiving, via an application programming interface exposed by the network address translation virtual function, network address translation configuration data, wherein the network address translation switch is configured by the network address translation configuration data, and wherein the network address translation configuration data specifies one network address translation technique of a plurality of network address translation techniques to be applied by the network address translation function.

16. The computer storage medium of claim 13, wherein the network address translation function comprises the network address translation virtual function and the network address translation switch.

17. The computer storage medium of claim 16, wherein the network address translation virtual function operates on an application layer of a network.

18. The computer storage medium of claim 16, wherein the network address translation switch operates on a transport layer of a network.

* * * * *